United States Patent [19]
Lipner et al.

[11] Patent Number: 5,956,403
[45] Date of Patent: *Sep. 21, 1999

[54] SYSTEM AND METHOD FOR ACCESS FIELD VERIFICATION

[75] Inventors: Steven B. Lipner, Oakton, Va.; David M. Balenson, Olney, Md.; Carl M. Ellison, Baltimore, Md.; Stephen T. Walker, Gleenwood, Md.

[73] Assignee: Network Association, Inc., Rockville, Md.

[ * ] Notice: This patent is subject to a terminal disclaimer.

[21] Appl. No.: 08/874,459

[22] Filed: Jun. 16, 1997

Related U.S. Application Data

[63] Continuation of application No. 08/715,377, Sep. 12, 1996, Pat. No. 5,640,454, which is a continuation of application No. 08/289,602, Aug. 11, 1994, Pat. No. 5,557,346.

[51] Int. Cl.$^6$ ........................................................ H04L 9/00
[52] U.S. Cl. ................................................. 380/21; 380/30
[58] Field of Search ................................. 380/4, 21, 25, 380/30

[56] References Cited

U.S. PATENT DOCUMENTS

| | | | |
|---|---|---|---|
| 4,200,770 | 4/1980 | Hellman et al. | 380/30 |
| 4,386,233 | 5/1983 | Smid et al. | 380/30 |
| 4,405,829 | 9/1983 | Rivest et al. | 380/30 |

(List continued on next page.)

FOREIGN PATENT DOCUMENTS

| | | |
|---|---|---|
| 0 493 232 | 7/1992 | European Pat. Off. . |
| WO 92/09161 | 5/1992 | WIPO . |
| WO 93/21708 | 10/1993 | WIPO . |

OTHER PUBLICATIONS

Harn, L. and H. Y. Lin, "Integration of User Authentication and Access Control," *IEEE Proceedings–E*, vol. 139, No. 2, pp. 139–143, Mar. 1992.

Brickell et al., "SKIPJACK Review: Interim Report: The SKIPJACK Algorithm," *Georgetown University, Office of Public Affairs*, pp. 1–6, Jul. 28, 1993.

Computer Systems Laboratory, National Institute of Standards and Technology, Gaithersburg, MD, "Escrowed Encryption Standard (EES)," *Federal Information Processing Standards Publication*, FIPS Pub 185, Feb. 9, 1994.

Denning, Dorothy, "The Clipper Chip: A Technical Summary," Revised Apr. 21, 1993.

Denning, Dorothy, "The Clipper Chip: A Technical Summary," Apr. 19, 1993.

Micali, S., "Fair Cryptosystems," Aug. 11, 1993.

(List continued on next page.)

*Primary Examiner*—Salvatore Cangialosi
*Attorney, Agent, or Firm*—Pennie & Edmonds LLP

[57] ABSTRACT

A system and method for key escrow cryptography for use in a system comprising a sender and a receiver. Only public escrow keys are stored in the sender and the receiver. The sender encrypts a message using a secret session key (KS), and generates a leaf verification string (LVS) by combining an unique program identifier (UIP), a public portion of a program unique key (KUpub), and a signature. The sender encrypts the KS using the KUpub to generate a first encrypted session key (EKS), and generates a first law enforcement access field (LEAF) by encrypting a combination of the first EKS and the UIP with a copy of a public portion of a family key (KFpub) stored in the sender. The encrypted message, the LVS, and the first LEAF are transmitted from the sender to the receiver. The receiver stores therein a public portion of the KEPF key (KEPFpub). The receiver extracts the UIP, KUpub, and the signature from the LVS, and then encrypts the KS using the extracted KUpub to generate a second encrypted session key (EKS). The receiver generates a second LEAF by encrypting a combination of the second EKS and the extracted UIP with a copy of the KFpub stored in the receiver. The receiver then compares the first LEAF to the second LEAF. If the first LEAF is equal to the second LEAF, then the receiver decrypts the encrypted message using the KS.

53 Claims, 14 Drawing Sheets

U.S. PATENT DOCUMENTS

| | | | |
|---|---|---|---|
| 4,590,470 | 5/1986 | Koenig et al. | 340/825.31 |
| 4,607,137 | 8/1986 | Jansen et al. | 380/30 |
| 4,868,877 | 9/1989 | Fischer | 380/25 |
| 4,910,774 | 3/1990 | Barakat | 380/30 |
| 4,926,480 | 5/1990 | Chaum | 380/23 |
| 4,947,430 | 8/1990 | Chaum | 380/25 |
| 4,996,711 | 2/1991 | Chaum | 380/30 |
| 5,005,200 | 4/1991 | Fischer | 380/30 |
| 5,144,665 | 9/1992 | Takaragi et al. | 380/30 |
| 5,191,611 | 3/1993 | Lang | 380/25 |
| 5,200,999 | 4/1993 | Matyas et al. | 380/25 |
| 5,210,795 | 5/1993 | Lipner et al. | 380/23 |
| 5,214,702 | 5/1993 | Fischer | 380/30 |
| 5,224,163 | 6/1993 | Gasser et al. | 380/30 |
| 5,226,080 | 7/1993 | Cole et al. | 380/25 |
| 5,263,157 | 11/1993 | Janis | 395/600 |
| 5,265,163 | 11/1993 | Golding et al. | 380/25 |
| 5,265,164 | 11/1993 | Matyas et al. | 380/30 |
| 5,267,313 | 11/1993 | Hirata | 380/21 |
| 5,276,736 | 1/1994 | Chaum | 380/24 |
| 5,276,737 | 1/1994 | Micali | 380/30 |
| 5,276,901 | 1/1994 | Howell et al. | 395/800 |
| 5,280,527 | 1/1994 | Gullman et al. | 380/23 |
| 5,299,263 | 3/1994 | Beller et al. | 380/30 |
| 5,313,521 | 5/1994 | Torii et al. | 380/21 |
| 5,313,637 | 5/1994 | Rose | 395/725 |
| 5,315,658 | 5/1994 | Micali | 380/30 |
| 5,341,426 | 8/1994 | Barney et al. | 380/21 |
| 5,347,578 | 9/1994 | Duxbury | 380/4 |
| 5,351,293 | 9/1994 | Michener et al. | 380/21 |
| 5,371,794 | 12/1994 | Diffie et al. | 380/21 |
| 5,373,559 | 12/1994 | Kaufman et al. | 380/30 |
| 5,386,470 | 1/1995 | Carter et al. | 380/48 |
| 5,406,628 | 4/1995 | Beller et al. | 380/30 |
| 5,436,972 | 7/1995 | Fischer | 380/25 |
| 5,481,613 | 1/1996 | Ford et al. | 380/30 |
| 5,557,346 | 9/1996 | Lipner et al. | 380/21 |
| 5,557,765 | 9/1996 | Lipner et al. | 380/21 |
| 5,564,106 | 10/1996 | Puhl et al. | 380/21 |
| 5,640,454 | 6/1997 | Lipner et al. | 380/25 |

OTHER PUBLICATIONS

Branstad et al., Draft Proposed Escrowed Encryption Standard, viewgraphs presented at Computer Security and Privacy meeting, Mar. 1994.

Blaze, M., "Protocol Failure in the Escrowed Encryption Standard," presented on the Internet, Jun. 3, 1994.

Scheidt et al., "Private Escrow Key Management," Key Escrow Encryption Workshop, paper distributed Jun. 10, 1994.

"A Solution for the International Community," TECSEC, Key Escrow Encryption Workshop, viewgraphs distributed Jun. 10, 1994.

"Private Escrow Key Management," TECSEC, Key Escrow Encryption Workshop, viewgraphs distributed Jun. 10, 1994.

"An Advanced Key Management System," TECSEC, Key Escrow Encryption Workshop, paper distributed Jun. 10, 1994.

Denning, Dorothy, "International Key Escrow Encryption: Proposed Objectives," *Georgetown University*, draft of May 23, 1994.

Denning, Dorothy et al., "Key Escrowing Today," *Georgetown University*, pre–published draft on Jul. 13, 1994 of *IEEE Communications* of Sep. 1994.

Eldridge, Alan, Lotus Notes, "Key Escrow for Lotus Notes," comments submitted in Key Escrow Alternatives Workshop, Jun. 10, 1994.

Fischer, Addison, Fischer International, "Software Key Escrow—Corporate Implementation," comments submitted in Key Escrow Alternatives Workshop, Jun. 10, 1994.

Novell, "Encryption Alternatives," comments submitted in Key Escrow Alternatives Workshop, Jun. 10, 1994.

Computer Associates International, Inc., "Commercial Cryptography Perspectives," comments submitted in Key Escrow Alternatives Workshop, Jun. 10, 1994.

Puhl, Larry, Motorola, comments submitted in Key Escrow Alternatives Workshop, Jun. 10, 1994.

Ferguson, Bill, Semaphore, comments submitted in Key Escrow Alternatives Workshop, Jun. 10, 1994.

COMPAQ Computer Corporation, "Proposed NIST Draft," comments submitted in Key Escrow Alternatives Workshop, Jun. 10, 1994.

Housley, Russell, SPYRUS, letter to Lynn McNulty, Aug. 3, 1994.

Desmedt, Yvo et al., "A Scientific Statement on the Clipper Chip Technology and Alternatives," *University of Wisconsin*, Milwaukee.

Denning, D. et al., "A Taxonomy for Key Escrow Encryption Systems", draft distributed Sep. 24, 1994.

Denning, D., "Key Escrow Encryption: Does it Protect or Compromise User Interests?", Jan. 3, 1995.

Denning, D., "Observations About Key Escrow Alternatives", Jan. 2, 1995.

Droge, John C., "International Key Escrow", presented to NIPLI, Sep. 22, 1994.

Ford et al., "A Key Distribution Method for Object–Based Protection", presented at the *Second ACM Conference on Computer and Communications Security*, Nov. 2–4, 1994, Fairfax, VA, pp. 193–197.

Maher, David P., "Trust in the New Information Age", *AT&T Technical Journal*, Sep./Oct. 1994, vol. 73, No. 5, Security Technologies, pp. 9–16.

Zimmerman, P., "Phil's Pretty Good Software Presents PGP: Pretty Good Privacy Public Key Encryption for the Masses", *PGP User's Guide vol. I: Essential Topics*, Dec. 3, 1992, pp. 1–40.

Zimmerman, P., "Phil's Pretty Good Software Presents PGP: Pretty Good Privacy Public Key Encryption for the Masses", *PGP User's Guide vol. II: Special Topics*, Dec. 3, 1992, pp. 1–53.

*Appendix A. Internal Data Structures Used by PGP 2.1*, Dec. 3, 1992, pp. 1–18.

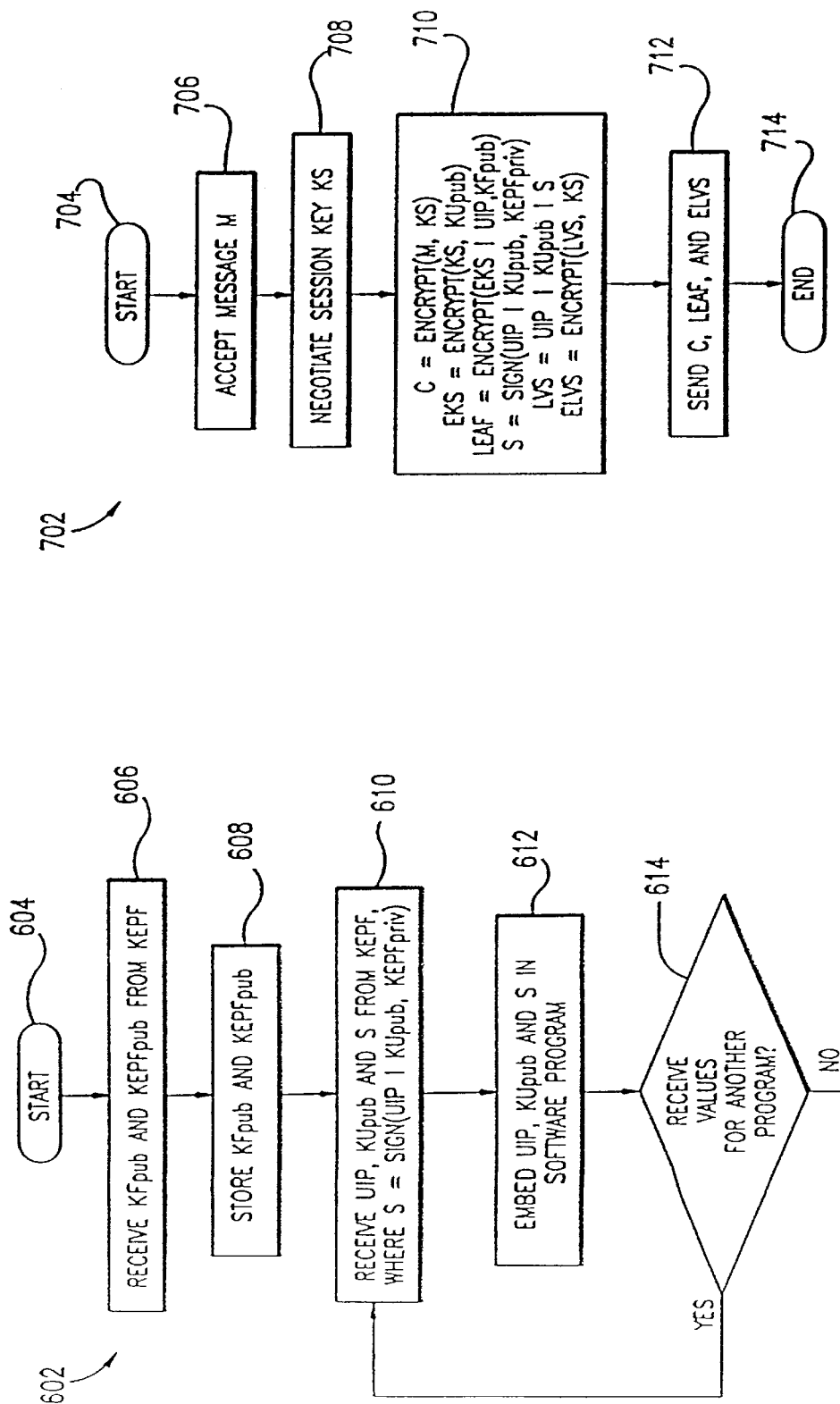

SYSTEM AND METHOD FOR ACCESS FIELD VERIFICATION

This application is a continuation of application Ser. No. 08/715,377 filed Sep. 12, 1996, now U.S. Pat. No. 5,640,454 which is a continuation of application Ser. No. 08/289,602, filed Aug. 11, 1994 U.S. Pat. No. 5,557,346, issued Sept. 17, 1996.

BACKGROUND OF THE INVENTION

1. Field of the Invention

The present invention relates generally to data encryption, and more particularly to key escrow data encryption.

2. Related Art

Introduction

An United States Presidential announcement on Apr. 16, 1993, referred to as the "Clipper initiative," called for the development of a hardware implementation of a classified encryption algorithm called "Skipjack". The Presidential announcement characterized the Skipjack algorithm as being "significantly stronger than those currently available to the public." The hardware implementation of Skipjack would also include a capability called "key escrow" which allows the government to recover the keys used for data encryption. The integrated circuit chip which implements the Skipjack algorithm is called the "Clipper chip" and/or the "Capstone chip".

The Clipper initiative (particularly the key escrow feature) attempts to preserve the ability of law enforcement and national security to intercept and exploit the contents of communications while providing law-abiding citizens with an encryption system much stronger than any now available to them. The announcement of the Clipper initiative and the subsequent discussions made it clear that, while Skipjack is a stronger encryption algorithm than the current unclassified Data Encryption Standard (DES), law enforcement entities considered that the proliferation of DES voice security devices would be a significant impediment to their need to preserve the ability to accomplish court-ordered wiretaps.

A great deal of resistance to the Clipper initiative was evident in the public reaction to the April 16 announcement. Objections were expressed in various forms, but the following key points stand out:

- Many people objected to the potential for loss of privacy that would result from the deployment of key escrow cryptography and the associated sharing of heretofore private cryptographic keys with government escrow agents.
- Many people raised objections to the Administration's attempt to use the buying power of the government to impose as de facto standards a family of encryption products that could be defeated at will by government agencies.
- Some people objected to the introduction of a classified algorithm as the standard for the protection of unclassified information. DES is public and has had wide scrutiny in its fifteen year life. There were suggestions that Skipjack might have a defect or trap door (other than the key escrow process). These objections were not quieted by the favorable review of Skipjack by a panel of outside cryptographers.
- Many people (especially suppliers of Information Technology products) objected to the requirement for a hardware implementation because of its cost and because of the limitations that the need to accommodate a government-designed chip imposes on overall system or product design.

In August 1993, the National Institute of Standards and Technology (NIST) announced a cooperative program with industry to explore possible approaches to the implementation of key escrow in software (without the need for dedicated hardware components such as the Clipper or Capstone chips).

There are a number of issues that intertwine in any discussion of this topic. Such issues include hardware implementation, classified encryption algorithms, and how much trust one must put in the user of the encryption process. These issues are considered below. However, before addressing these issues, it will be useful to consider key escrow.

Key Escrow Cryptography

Key escrow adds to products that implement cryptography features that allow authorized parties to retrieve the keys for encrypted communications and then decrypt the communications using such keys. In the Clipper initiative, keys for each encryption device are mathematically divided into two halves (each equal in length to the original key) and the halves are held by two separate escrow agents. Both escrow agents must cooperate (to regenerate the original key) before the communications from a given device can be decrypted. For Clipper, the escrow agents are government agencies who require assurance that the law enforcement agency requesting the keys has a court order authorizing a wiretap for the communications in question.

A number of needs have been cited to justify key escrow cryptography. Some apply to the needs of law enforcement and national security, while others apply to the needs of individual users or organizations:

- Law enforcement and national security agencies are concerned that growing use of encrypted communications will impair their ability to use court-ordered wiretapping to solve crimes and prevent acts of terrorism. Widespread use of key escrow cryptography would preserve this ability for these agencies, while providing the public with the benefits of good quality cryptography. In the case of law enforcement and national security, government escrow agents provide access to communications when authorized by a court order.
- Some corporations have expressed a concern that careless or malicious mismanagement of keys by employees might deny the corporation access to its valuable information. Key escrow cryptography at the corporate level has been advocated as a mechanism by which such corporations might regain access to their information. In this sort of application, one might have senior management or personnel offices serve as escrow agents who would permit an employee's supervisor to gain access to his or her files or communications.
- Individuals who use encryption for their own information may forget or lose the passwords that protect their encryption keys, die, or become incapacitated. Key escrow cryptography has been proposed as a safety mechanism for such individuals. In this case, an individual might select friends or attorneys as escrow agents who would allow the individual (or perhaps the executor of his or her estate) access to protected information.
- In some cases, government agencies have the authority to monitor the business communications of their employees. Such authority applies, for example, in military and national security installations where it is used to detect the misuse of classified or sensitive information. Key escrow cryptography offers such agencies the opportunity to exercise their authority to monitor even for encrypted communications. In this application, communications security officers might serve as escrow agents who would grant access to line managers or commanders.

The Clipper initiative focuses on the first of the four applications for key escrow cited above. In addition, the Clipper initiative couples the introduction of key escrow with the introduction of Skipjack, a new classified encryption algorithm much stronger than the unclassified DES.

Opponents of the Clipper initiative have argued that a key escrow encryption system such as Clipper can be defeated by sophisticated users such as organized crime, who have the ability to write or buy their own encryption system (without key escrow) and either ignore the key escrow products altogether or encrypt first under their own system and then under the key escrow system. Other options are open to pairs of users who wish to cooperate to defeat key escrow, and some opponents of the Clipper initiative have suggested that the only way to deter such options is to forbid non-escrowed encryption by law and to enforce the law with a vigorous program of monitoring communications—an unappealing prospect to say the least.

Proponents of the Clipper initiative counter that they are well aware that pairs of cooperating users have many ways to avoid key escrow. The objective that these proponents cite is to make it difficult or impossible for a single "rogue" user to communicate securely with parties (or more precisely with escrowed encryption devices) that believe they are engaged in a communication where both communicants are faithfully following the escrow rules.

The "single rogue user" scenario constitutes a test for a key escrow system. A successful key escrow system (hardware or software) should prevent a single rogue user from exploiting the cryptography in the escrowed product, and from defeating or bypassing the product's key escrow features, while still enabling secure communication with other users (products) that believe that they and the rogue user are implementing the escrow features correctly.

The "Clipper" chip addresses the "single rogue user" by embedding the key for each individual communication session in a Law Enforcement Access Field (LEAF) that is encrypted under a secret key (the Family Key) that is common to all "Clipper" chips. The embedded information includes a checksum that depends on the session key. The receiving "Clipper" chip also holds the Family Key; thus, it can decrypt the LEAF and verify that the checksum is the correct one for the current session key (which both chips must share in private for communication to be successful and secure). All "Clipper" chips share the embedded Family Key and rely on the tamperproof hardware of the chip to protect the Family key from disclosure.

Hardware Implementation of Key Escrow Cryptography

There are several factors that support the decision to require the use of separate hardware in the design of the key escrow products proposed as part of the Clipper initiative (Clipper and Capstone chips). Some of these factors, discussed below, are related to the introduction of key escrow cryptography, some to the use of a classified encryption algorithm, and some to the choice of a conservative standard for the design of encryption products.

Separate hardware provides a degree of protection for the encryption process difficult to obtain in software systems. An errant or malicious computer program can not corrupt the encryption algorithm or key management embedded in a hardware encryption device such as the Clipper or Capstone chip.

Separate hardware provides a degree of protection for the key escrow process difficult to obtain in software systems. While software can manipulate the externally visible parameters of the escrow process, hardware at least provides some assurance that the escrow operations are performed or verified.

If a classified encryption algorithm such as Skipjack is used, separate hardware that implements special protective measures may be essential to protect the design of the algorithm from disclosure.

Secret cryptographic keys can be provided with a high degree of protection on a hardware device since unencrypted keys need never appear outside the device. In contrast, it is difficult or even impossible to protect secret keys embedded in software from users with physical control of the underlying computer hardware.

Proliferation of an encryption capability is perceived to be easier to control with respect to accounting for controlled devices and restriction of exports with hardware devices than with embedded software.

The list above makes it clear that some of the need for hardware in the Clipper initiative derives from a need to protect the classified Skipjack algorithm, some from conservative design of the encryption system, and some from a need to protect the escrow process.

Use of a Classified Data Encryption Algorithm

The Skipjack encryption algorithm that was introduced with the Clipper initiative is claimed to be much stronger than existing publicly available algorithms such as DES. Having a strong algorithm is a valuable selling point for any new encryption initiative. But, as the discussion above pointed out, protecting a classified algorithm from disclosure requires, at least at the current state of technology, a hardware implementation that embodies special measures to resist reverse engineering.

Classified encryption algorithms are often considered much stronger than those in the public domain since the algorithms used to protect government classified information are classified. But because they are not available for public review, suggestions that classified algorithms be used to protect unclassified information are suspect due to the possible existence of unknown deliberate trapdoors or unintentional flaws. While DES was initially viewed with suspicion by some, it was subject to intense public scrutiny and its principal strength now is that even after fifteen years, no serious flaw has been found.

Key escrow techniques as such do not require classified algorithms and can be used with publicly available algorithms such as DES and IDEA or with proprietary but unclassified algorithms such as RSADSI's RC2 and RC4. If a publicly available or proprietary unclassified algorithm were used in a product that embodied key escrow cryptography, it would not be necessary to have a hardware implementation for the purpose of protecting the encryption algorithm from disclosure (although there are other reasons for implementing key escrow cryptography in hardware, as the above list indicates).

This interdependence between hardware implementation and classified algorithm has caused considerable confusion in examining the feasibility of software key escrow approaches. If one requires a classified algorithm, one must use hardware to protect the algorithm whether one implements key escrow or not. If one chooses an unclassified public or proprietary algorithm, one is free to implement in hardware or software. The decision to implement in hardware and software is driven by other factors, such as those identified in the above list.

Benefits and Limitations of Software Encryption

Historically, encryption systems that have been used to protect sensitive information have been implemented as separate hardware devices, usually outboard "boxes" between a computer or communications system and a communications circuit. Such devices are designed with a high level of checking for operational integrity in the face of failures or malicious attack, and with especially careful measures for the protection of cryptographic functions and keys.

Software encryption systems have historically been viewed with suspicion because of their limited ability to protect their algorithms and keys. The paragraphs above discussed the issues associated with protecting classified (or secret) encryption algorithms from disclosure. Over and above these issues is the fact that an encryption algorithm implemented in software is subject to a variety of attacks. The computer's operating system or a user can modify the code that implements the encryption algorithm to render it ineffective, steal secret cryptographic keys from memory, or, worst of all, cause the product to leak its secret cryptographic keys each time it sends or receives an encrypted message.

The principal disadvantage of using encryption hardware, and therefore the primary advantage of integrated software implementations, is cost. When encryption is implemented in hardware, whether a chip, a board or peripheral (such as a PCMCIA card) or a box, end users have to pay the price. Vendors must purchase chips and design them into devices whose costs go up because of the additional "real estate" required for the chip. End users must purchase more expensive devices with integrated encryption hardware, or must buy PCMCIA cards or similar devices and then pay the price for adding a device interface to their computing systems or dedicating an existing interface to encryption rather than another function such as that performed by a modem or disk.

A second major advantage of software implementations is simplicity of operation. Software solutions can be readily integrated into a wide variety of applications. Generally, the mass market software industry, which attempts to sell products in quantities of hundreds of thousands or millions, seeks to implement everything it can in software so as to reduce dependencies on hardware variations and configurations and to provide users with a maximum of useful product for minimum cost.

SUMMARY OF THE INVENTION

The present invention is directed to a system and method for key escrow cryptography for use in a system comprising a sender and a receiver. By "sender" we mean a program or device that encrypts data for subsequent transport or storage. By "receiver" we mean a program or device that decrypts data that has been received or retrieved from storage. Only public keys are stored in the sender and the receiver so there is no need for secrecy of the software. According to the present invention, the sender encrypts a message using a secret session key (KS), and generates a leaf verification string (LVS) by combining an unique program identifier (UIP), a public portion of a program unique key (KUpub), and a signature. The signature represents the UIP and KUpub signed by a private portion of a key escrow programming facility (KEPF) key (KEPFpriv). An encrypted LVS (ELVS) is formed by encrypting LVS using KS.

The sender encrypts the KS using the KUpub to generate a first encrypted session key (EKS), and generates a first law enforcement access field (LEAF) by encrypting a combination of the first EKS and the UIP with a copy of a public portion of a family key (KFpub) stored in the sender. The encrypted message, the ELVS, and the first LEAF are transmitted from the sender to the receiver.

The receiver operates as follows. The receiver stores therein a public portion of the KEPF key (KEPFpub) and a public portion of the Family Key (KFpub). The receiver decrypts ELVS using KS and extracts the UIP, KUpub, and the signature from the LVS, and verifies the signature using KEPFpub. If the verification succeeds, the receiver then encrypts the KS using the extracted KUpub to generate a second encrypted session key (EKS). The receiver generates a second LEAF by encrypting a combination of the second EKS and the extracted UIP with a copy of the KFpub stored in the receiver. The receiver then compares the first LEAF to the second LEAF.

If the first LEAF is equal to the second LEAF, then the receiver decrypts the encrypted message using the KS.

The present invention operates so that, with neither tamper resistance nor secrecy of the hardware or software of the sender or the receiver, no party having modified the hardware or software of either the sender or receiver can communicate successfully with an unmodified receiver or sender and, at the same time, prevent law enforcement from gaining authorized access to the communication.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein:

FIGS. 2–9 and 17 are flowcharts depicting the key escrow cryptographic system according to the first embodiment of the present invention;

DETAILED DESCRIPTION OF THE PREFERRED EMBODIMENTS

Figure 1:
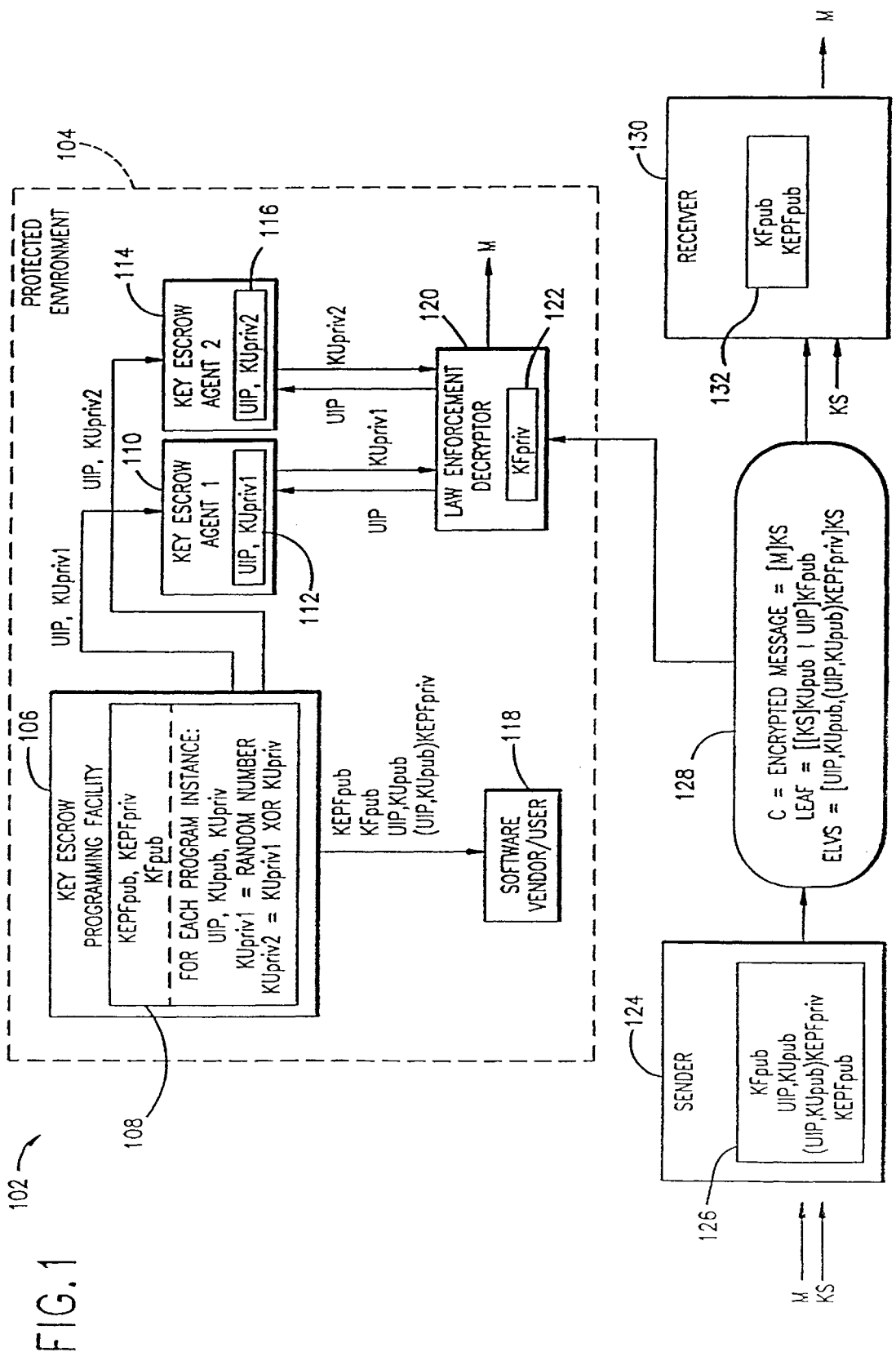
FIG. 1 is a block diagram of a key escrow cryptographic system according to a first embodiment of the present invention.

The present invention is directed to a system and method for key escrow cryptography. Preferably, the present invention is implemented in software. However, the present invention works equally well when implemented using hardware.

The present invention preferably employs an unclassified data encryption algorithm. Thus, the objection that software cannot protect a classified encryption algorithm does not apply to the present invention.

Another objection against software is that it cannot ensure that the key escrow software will function correctly and not be modified by a user to bypass or corrupt the escrow process. It is noted that this objection is not limited to just software, but also applies to hardware implementations which allow software to control the flow of information to and from the hardware encryption device.

Another objection against software is that it is impossible to embed secret cryptographic keys in a software product without a significant risk that they would be disclosed. The present invention addresses and solves this problem inherent in conventional software implementations of key escrow by not embedding secret keys or private keys in the sender and receiver software modules. This feature of the present invention is discussed below.

Preferably, in the present invention, encryption and decryption operations are performed using any well known, unclassified, and publicly available algorithms such as DES and IDEA or with any well known, proprietary but unclassified algorithms such as RSADSI's RC2 and RC4. The specific details of the encryption and decryption algorithm are not material to the present invention.

The following symbols are used herein.

[a]b indicates that "a" is encrypted using key "b"; similarly, encrypt(e,f) indicates that "e" is encrypted using key "f".

{x}y indicates that "x" is digitally signed using well known procedures using key "y"; similarly, sign(a,b) indicates that "a" is digitally signed using key "b".

a|b indicates that "a" is concatenated with "b".

decrypt(m,n) indicates that "m" is decrypted using key "n".

extract(g,h) indicates that "h" is extracted using well known procedures from concatenated value "g".

verify(a,b,c) indicates that the signature "b" of "a" is verified using key "c".

xor(o,p) indicates that "o" is bitwise exclusive-OR'ed with "p".

As used herein, values having labels with a suffix "priv" are considered to be private or secret. Values having labels with a suffix "pub" are considered to be public.

Overview of the Present Invention

Described below are two embodiments of the key escrow cryptography system and method of the present invention. Both embodiments generally share the following preferred features:

Both embodiments ensure that no party having modified the software of sender or receiver can communicate successfully with an unmodified receiver or sender and, at the same time, deny law enforcement authorized access to the communication.

For both embodiments, the receiving party to a communication reconstructs the sender's LEAF to verify that the received LEAF is both valid and the correct LEAF for the current encrypted communication. This choice counters single rogue attacks.

Both use an escrow protocol based on public key cryptography to build the law enforcement access field (LEAF) that makes the user's keys available to law enforcement authorities. This choice obviates the need to include in the software products any secret keys that would be part of the escrow process.

Both preferably use unclassified public or proprietary encryption algorithms to perform all cryptography functions.

First Embodiment

FIG. 1 is a block diagram of a key escrow system 102 according to a first embodiment of the present invention. The key escrow system 102 includes a key escrow programming facility (KEPF) 106, two or more key escrow agents (KEAs) 110, 114, sending and receiving entities 124, 130, and a law enforcement decryptor 120.

Figure 18:
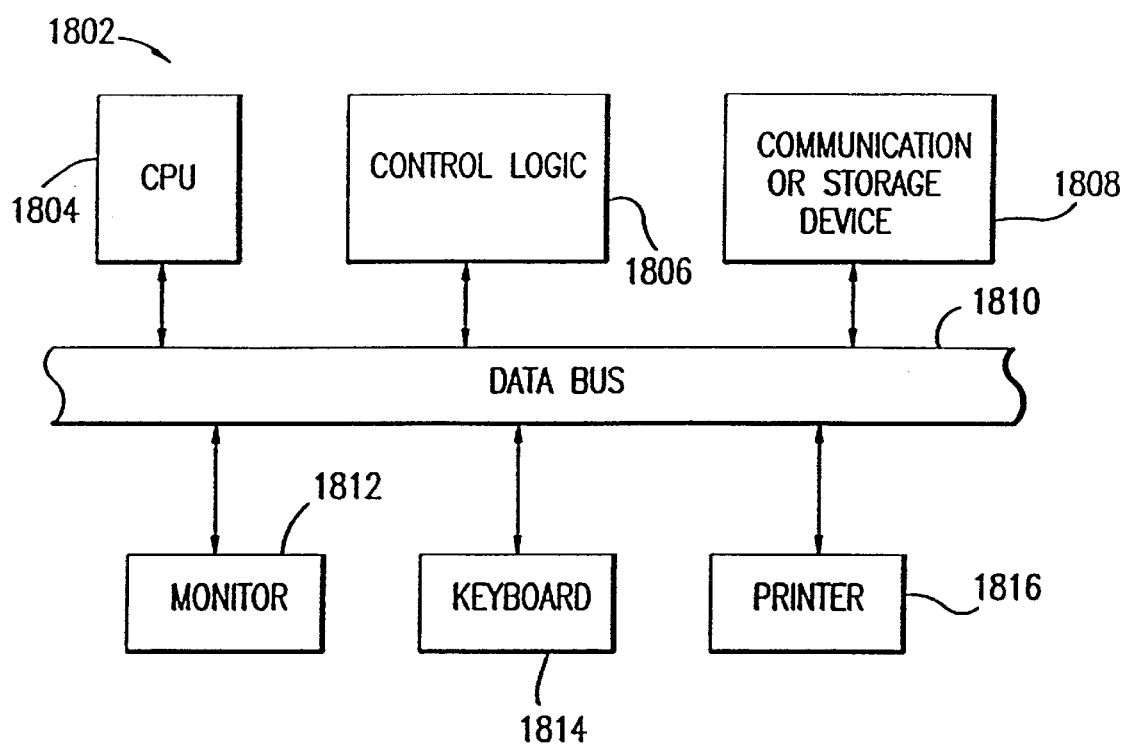
FIG. 18 is a block diagram of a data processor according to an embodiment of the present invention.

A block diagram of the sending entity 124 is shown in FIG. 18. Preferably, the sending entity 124 is a data processing device 1802 having a central processing unit (CPU) 1804 connected to other devices via a data bus 1810. The CPU 1804 operates in accordance with control logic 1806. Control logic 1806 is preferably a computer program, such that the CPU 1804 operates in accordance with instructions contained in the computer program.

The data processing device 1802 also includes a communications or storage device 1808, a monitor 1812, a keyboard 1814, and a printer 1816. Communications between the sending entity 124 and other devices, such as the receiving entity 130, are achieved by operation of the communication or storage device 1808, which is any well known transmitter or storage medium.

In accordance with the present invention, the control logic 1806 enables the sending entity 124 (and, in particular, the CPU 1804) to operate as discussed herein. For example, the control logic 1806 (when executed by the CPU 1804) enables the sending entity 124 to perform the steps shown in FIG. 7.

The structure of the receiving entity 130 is similar to the sending entity 124 and, thus, the above description applies equally well to the receiving entity 130. However, in accordance with the present invention, the control logic 1806 in the receiving entity 130 enables the receiving entity 130 (and, in particular, the CPU 1804) to operate as discussed herein. For example, the control logic 1806 (when executed by the CPU 1804) enables the receiving entity 130 to perform the steps shown in FIG. 8.

Since the control logic 1806 in both the sending and receiving entities 124, 130 preferably represent software, the sending and receiving entities 124, 130 are sometimes called herein "programs". However, it should be understood that such "programs" represent a device 1802 operating in accordance with software. Also, according to an alternate embodiment of the invention, the sending and receiving entities 124, 130 are implemented entirely in hardware (for example, the CPU 1804 and the control logic 1806 represent hardware state machine(s)).

As mentioned above, one difference between this system 104 and the Clipper/Capstone system is that this system 104 uses public key cryptography in place of conventional (symmetric) cryptography to generate the law enforcement access field or LEAF. As is well known, with symmetric cryptography, sender and receiver share a key that is used to control both encryption and decryption. With asymmetric cryptography, encryption and decryption use separate keys which cannot be computed from one another. Thus, an encryption key can be made public (a "public key") and anyone can send a secret message which can only be decrypted by the holder of the corresponding ("private") decryption key. The use of public key cryptography allows the software programs 124, 130 to generate and validate LEAFs without having to store secret keys or private keys. Only public quantities need be embedded in the software programs 124, 130 and, therefore the present invention does not need to preserve the secrecy of its own structure or content. The elements of the system 102 shall now be described.

The Key Escrow Programming Facility

The key escrow programming facility (KEPF) 106 is within a protected environment 104. A protected environment 104 is defined as a physically and procedurally secured area whose protection is adequate to the value of all information that will be protected by any key escrow encryption program.

Figure 2:
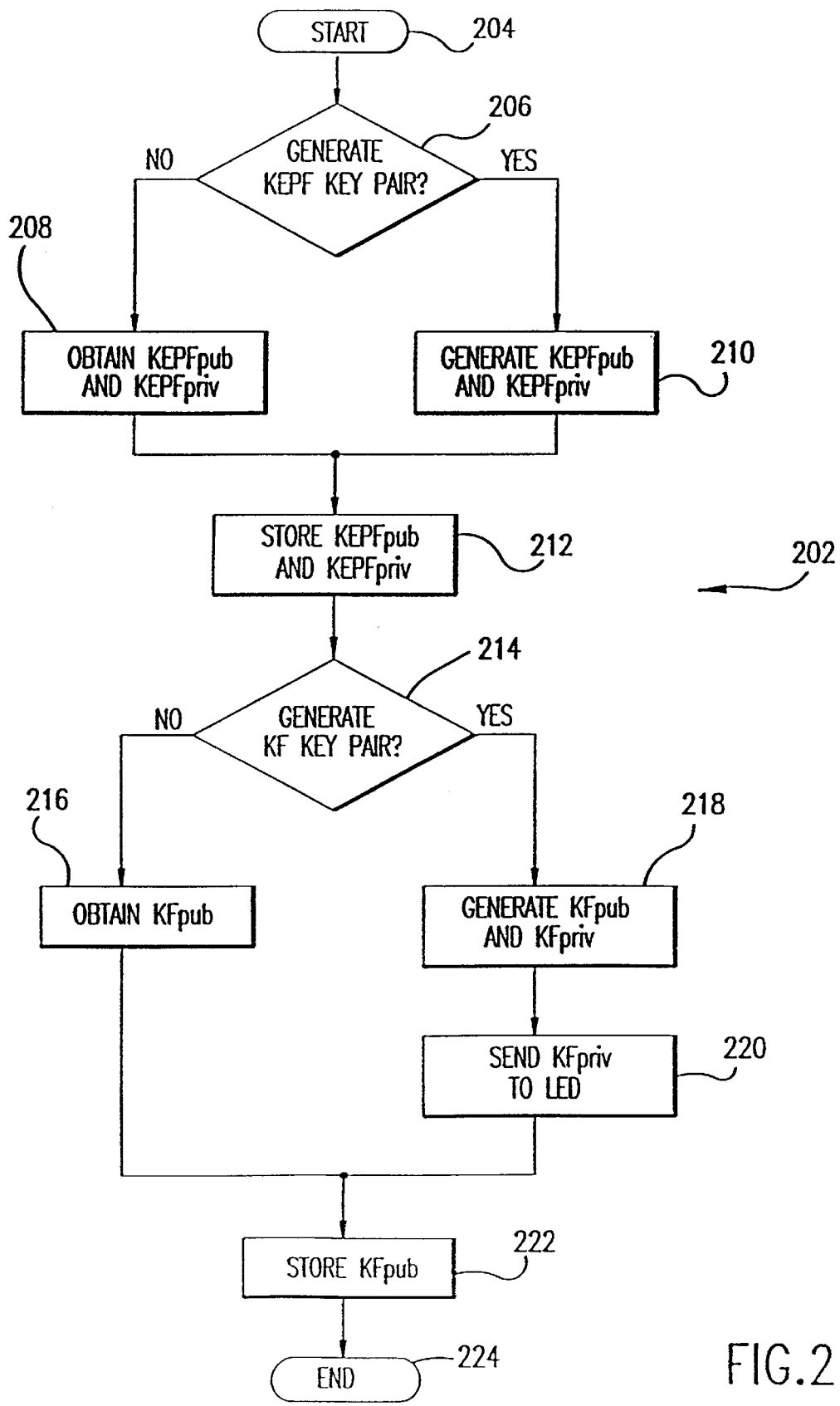

The KEPF 106 includes various cryptographic-related data 108. Such data 108 stored in the KEPF 106 cannot be accessed by persons or entities outside the protected environment 104. The manner in which the KEPF 106 initializes such data 108 shall now be described with reference to a flowchart 202 in FIG. 2.

The KEPF 106 is initialized with two public/private key pairs. The first is a KEPF public/private key pair, initialized in steps 206, 208, 210, and 212, which is used to sign and authenticate other components that are generated and distributed by the KEPF 106. The KEPF key pair is generated externally and loaded into the KEPF 106 (step 208), or generated internal to the KEPF 106 (step 210). Controls can be applied to the generation and custody of the KEPF key pair as they are to the family and seed keys that are used by the Clipper/Capstone chip programming facility. The KEPF public/private key pair is stored in a memory device in step 212.

The second key pair used by the KEPF is a family key (KF) and is initialized during steps 214, 216, 218, 220, and 222. KF is preferably generated external to the KEPF 106 (step 216), although it may be generated internally (step 218). Only the public component (KFpub) is sent to the KEPF 106 (step 222). The corresponding private component (KFpriv) is sent to the Law Enforcement Decryptor (LED) 120 (step 220). The private component of KF can also be split into halves and escrowed.

Law Enforcement Decryptor

The Law Enforcement Decryptor (LED) 120 is also within the protected environment 104. The LED includes the Family Private Key KFpriv 122.

Figure 4:
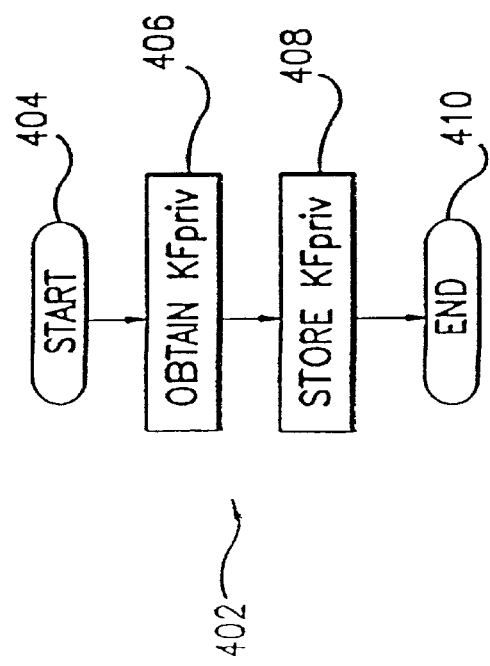

The LED 120 initializes the Family Private Key 122 as shown in FIG. 4. In step 406, the LED obtains the private component of KF, KFpriv, which is stored in a memory device in step 408.

Generating Program Parameters

Figure 3:
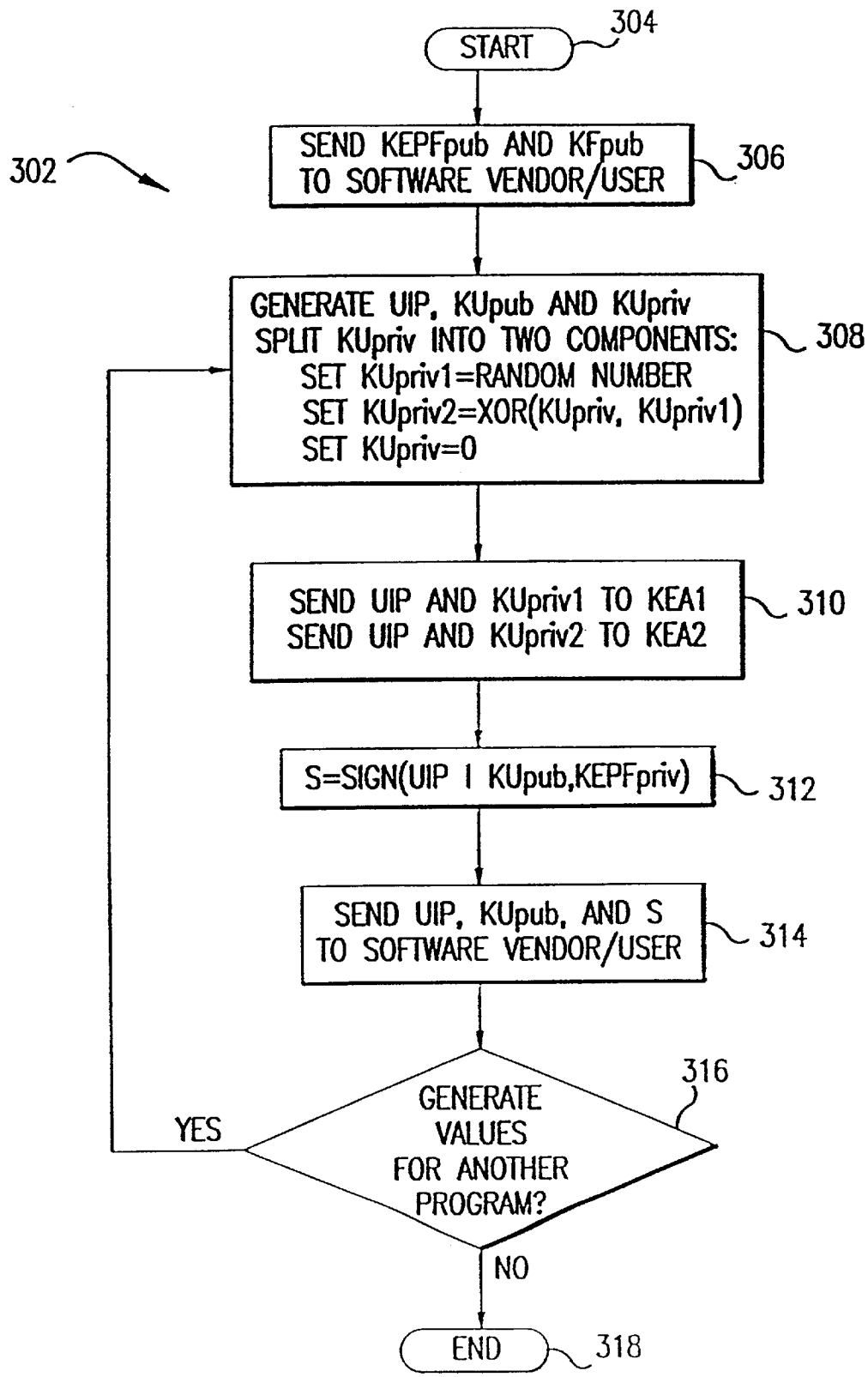

On an ongoing basis, the KEPF 106 signs and optionally generates unique program parameters for each program instance, just as the Clipper/Capstone programming facility programs each individual chip. In particular, as shown in a flowchart 302 of FIG. 3, the KEPF 106 in step 306 sends the KEPFpub and KFpub to a software vendor/user 118. Steps 308–316 are then performed for each program instance.

In step 308, the KEPF 106 generates or acquires a program unique identifier (UIP) and a program unique key (KU). KU is an asymmetric public/private key pair. KU is generated within the KEPF 106 and may be seeded with externally generated parameters that are loaded into the KEPF 106. The private component of KU (KUpriv) is split into halves (308). This is preferably done by generating a random bit string as long as KUpriv which becomes KUpriv1 and calculating KUpriv2 as the exclusive-OR of KUpriv1 and KUpriv. Other procedures could alternatively be used to split KUpriv.

Figure 5:
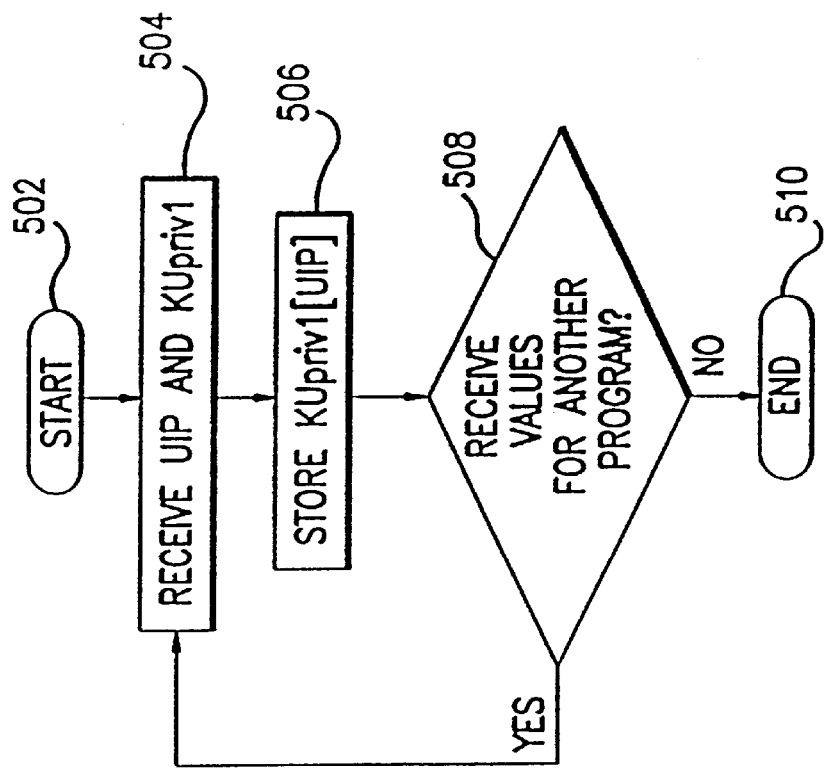

In step 310, the UIP and individual private key halves are escrowed with the two escrow agents (KEAs) 110, 114. Specifically, as shown in a flowchart 501 in FIG. 5, the escrow agent 110 receives the UIP and KUpriv1 (step 504) and stores UIP and KUpriv1 (step 506). These steps are repeated for each program instance, as indicated by step 508. The operation of the other escrow agent 114 is identical to this.

In steps 312 and 314, the KEPF 106 sends the program unique parameters, UIP and KUpub, to the software vendor 118 to be embedded into the software program product. In step 312, the KEPF 106 uses well known procedures to digitally sign these parameters using its private key, KEPFpriv, and sends the signature along with the components to the software vendor 118 (step 314). The programming facility public key (KEPFpub) and the family key public component (KFpub) are also sent to the vendor 118. Steps 308–314 are repeated for each program instance, as indicated by step 316.

Generating the Software Product

If the KEPF 106 communicates its public key KEPFpub to the vendor 118 by an out of band (secure) channel, the vendor 118 can reliably authenticate sets of parameters (KFpub, UIP, KUpub) received from the KEPF 106. This is the case since, as is well known, data digitally signed with a private key can be verified by anyone possessing the corresponding public key. Also, data encrypted with a public key can be decrypted only using the corresponding private key.

As represented in a flowchart 602 of FIG. 6, as the software vendor 118 manufactures software copies of its product, it embeds KFpub and KEPFpub in the product code (step 608). It had received KFpub and KEPFpub from the KEPF 106 (step 606). Each instance of the program must be initialized with:

KEPFpub

KFpub

KUpub unique to that instance of the program

UIP unique to that instance of the program

S={KFpub, KUpub, UIP}KEPFpriv unique to that instance of the program

This data can reside in the code of the program or in a storage file associated with the program. KEPFpub, KFpub, and S must come from the KEPF. KUpub, KUpriv, and UIP can be generated by the KEPF, the vendor or the program itself during initialization. S must be generated by the KEPF only on receipt or generation of a valid KUpub, KUpriv, pair and the successful escrowing of KUpriv.

Preferably, the vendor 118 embeds the program unique parameters (UIP, KUpub and the associated signatures) for each program into the media for the program (step 612). UIP, KUpub and the associated signatures were received from the KEPF 106 in step 610. Steps 610 and 612 are performed for each software product, as indicated by step 614.

The data described above is represented by reference number 126 in the sending program 124 and reference number 132 in the receiving program (FIG. 1).

Note that no secret keys or private keys are present within the software product. Only public quantities, KEPFpub, KFpub, and KUpub are embedded in the software product.

In cases where a software product is distributed on CDROM media that is manufactured in bulk (and can not accept unique serial number or key information), or where it is installed on a shared storage device for access by multiple users, it is not feasible to embed a unique KUpub, UIP and the associated signatures for each copy of the product. In these cases, the user of the product can be required to run an installation program that retrieves KUpub, and UIP and their signature over a network or communication line. The operation of the product's encryption function can be made contingent on the execution of the installation program and possession of KUpub, UIP, and the corresponding valid signature.

Since the only quantities that are needed to customize the escrow software for its user are digitally signed and public, there is no risk to retrieving them over a network or other insecure communication channel. Their confidentiality is not at issue, and their integrity can be authenticated using KEPFpub which is common to all users and copies of the product and can be embedded by the vendor 118.

An alternative to having the product retrieve KUpub and UIP is to have the product generate UIP and KU during the initialization process and send all components (UIP, KUpub and KUpriv) to the KEPF 106 encrypted under KEPFpub. In this variation, the KEPF 106 would split KUpriv and distribute the halves to the escrow agents 110, 114, sign [UIP|KUpub], and send {UIP|KUpub}KEPFpriv back to the product.

Operation of the Sending Program

As represented by a flowchart 702 in FIG. 7, the sending program 124 receives a data message M in step 706. In step 708, the sending program 124 and the receiving program 130 use any well known procedure for negotiating a secret session key 708. In steps 710 and 712, the sending program 124 encrypts and then transmits the data message M using the secret (or private) session key KS. This encrypted message C is denoted by [M]KS.

Also in step 710, the sending program 124 generates a LEAF by encrypting the session key KS under the program unique public key KUpub to thereby generate [KS]KUpub. [KS]KUpub is also called the encrypted session key, or EKS. The EKS is concatenated with the program unique identifier UIP to thereby generate [KS]KUpub|UIP. This value is encrypted with the family public key KFpub. The resulting LEAF is symbolized as [[KS]KUpub|UIP]KFpub. Note that in the present invention encryption of M is accomplished using symmetric encryption while encryption in the LEAF under keys KUpub and KFpub is accomplished using asymmetric, rather than symmetric cryptography.

Also in step 710, the sending program 124 generates a LEAF verification string (LVS) that includes: (1) the sending program 124's program unique identifier UIP, (2) program unique public key KUpub, and (3) the signature S applied to those two quantities by the key escrow programming facility 106, i.e., {UIP,KUpub}KEPFpriv (these three items are called the leaf verification string, LVS). This string is encrypted under the session key, KS. Thus, the ELVS, is represented as follows:

[UIP, KUpub, {UIP|KUpub}KEPFpriv]KS

In step 712, C, LEAF, and ELVS are sent to the receiving program 130.

Operation of the Receiving Program

Figure 8:
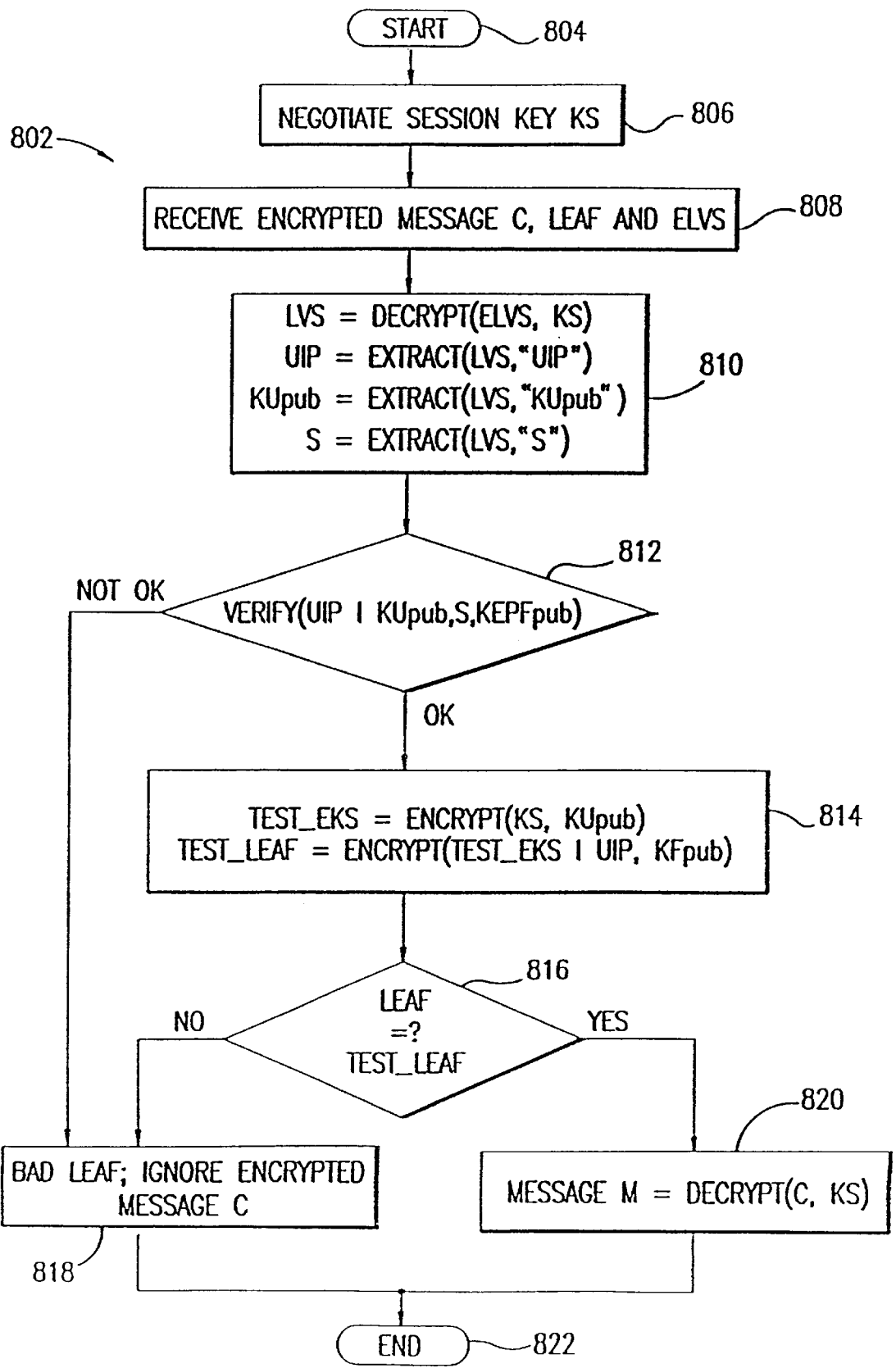
Figure 9:
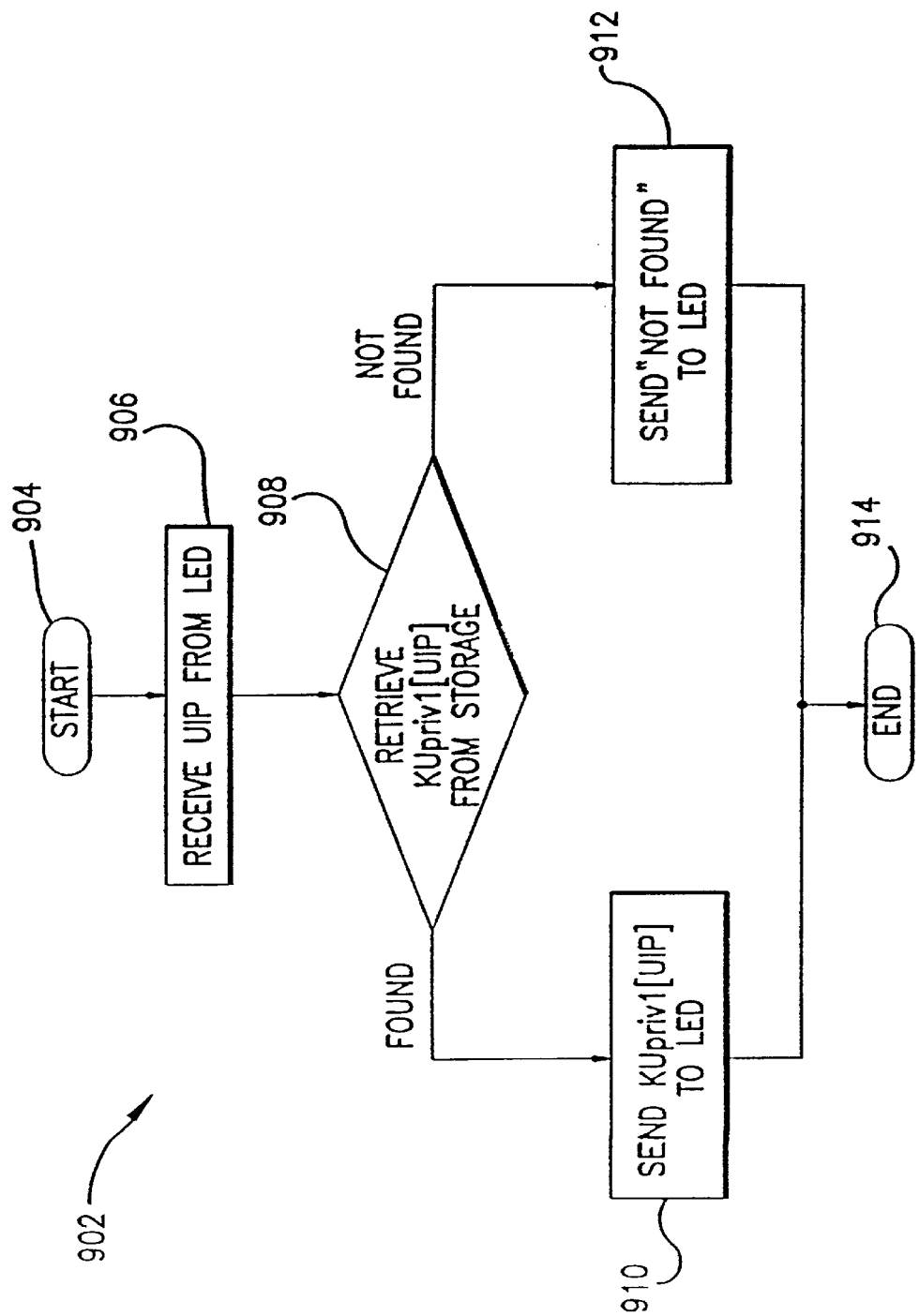

As represented in a flowchart 802 of FIG. 8, the receiving program 130 in step 806 negotiates a secret session key KS with the sending program 124 (this corresponds to step 708 in FIG. 7). In step 808, the receiving program 130 receives C, LEAF, and ELVS from the sending program 124.

In step 820, the receiving program 130 decrypts the encrypted message C using the session key KS to recover the message M. However, prior to doing so, the receiving program 130 must authenticate the LEAF to ensure that the sending program 124 has included a valid LEAF as part of the message transmission. This is done during steps 810, 812, 814, and 816.

Note that the receiving program 130 cannot decrypt the LEAF, since it does not have a copy of the family private key KFpriv. Instead, according to the present invention, the receiving program 130 authenticates the LEAF by reconstructing it. This is possible since the receiving program 130 has been provided with all of the components that make up the LEAF either through communication external to the operation of the escrow system (KF and KS) or because they were sent signed in the encrypted LEAF verification string ELVS.

Specifically, in step 810 the receiving program 130 decrypts the encrypted leaf verification string ELVS using the session key KS to obtain the leaf verification string LVS, or UIP, KUpub, {UIP|KUpub}KEPFpriv. Then in step 810 the receiving program 130 verifies that the received copies of the sending program 124's program unique key KUpub and program unique identifier UIP (which are in the LVS) are correct and authentic. This is done in step 812 by verifying the corresponding signature S or {UIP|KUpub}KEPFpriv using KEPFpub.

If the leaf verification string LVS is authentic (as determined in step 812), then the receiving program 130 in step 814 recalculates the LEAF (this is called the "test_LEAF" in FIG. 8) using KS, KFpub, and the sending program 124's KUpub and UIP. If the calculated LEAF is identical to the one received (as determined in step 816), then the LEAF is valid. Accordingly, the receiving program 130 accepts and decrypts the message (step 820). Otherwise, the receiving program 130 rejects the message (step 818).

The use of the session key KS to encrypt the leaf verification string LVS is not necessary to the function of verifying the LEAF. Instead, this step protects the sending program 124's UIP and KUpub from disclosure to parties who are not in communication with it.

Law Enforcement Decryptor

The law enforcement decryptor (LED) 120, which is operated by the law enforcement agency, contains the family private key KFpriv (indicated as 122 in FIG. 1). This is represented in a flowchart 402 of FIG. 4, where the LED 120 receives the KFpriv from the KEPF 106 in step 406 (corresponding to step 220 in FIG. 2 in the case where KFpriv is generated in the KEPF 106; where KFpriv is generated outside the KEPF 106 by an external entity, not shown, then the external entity sends the KFpriv to the LED 120). In step 408, the LED 120 stores the KFpriv in a memory device of the LED 120.

Figure 17:
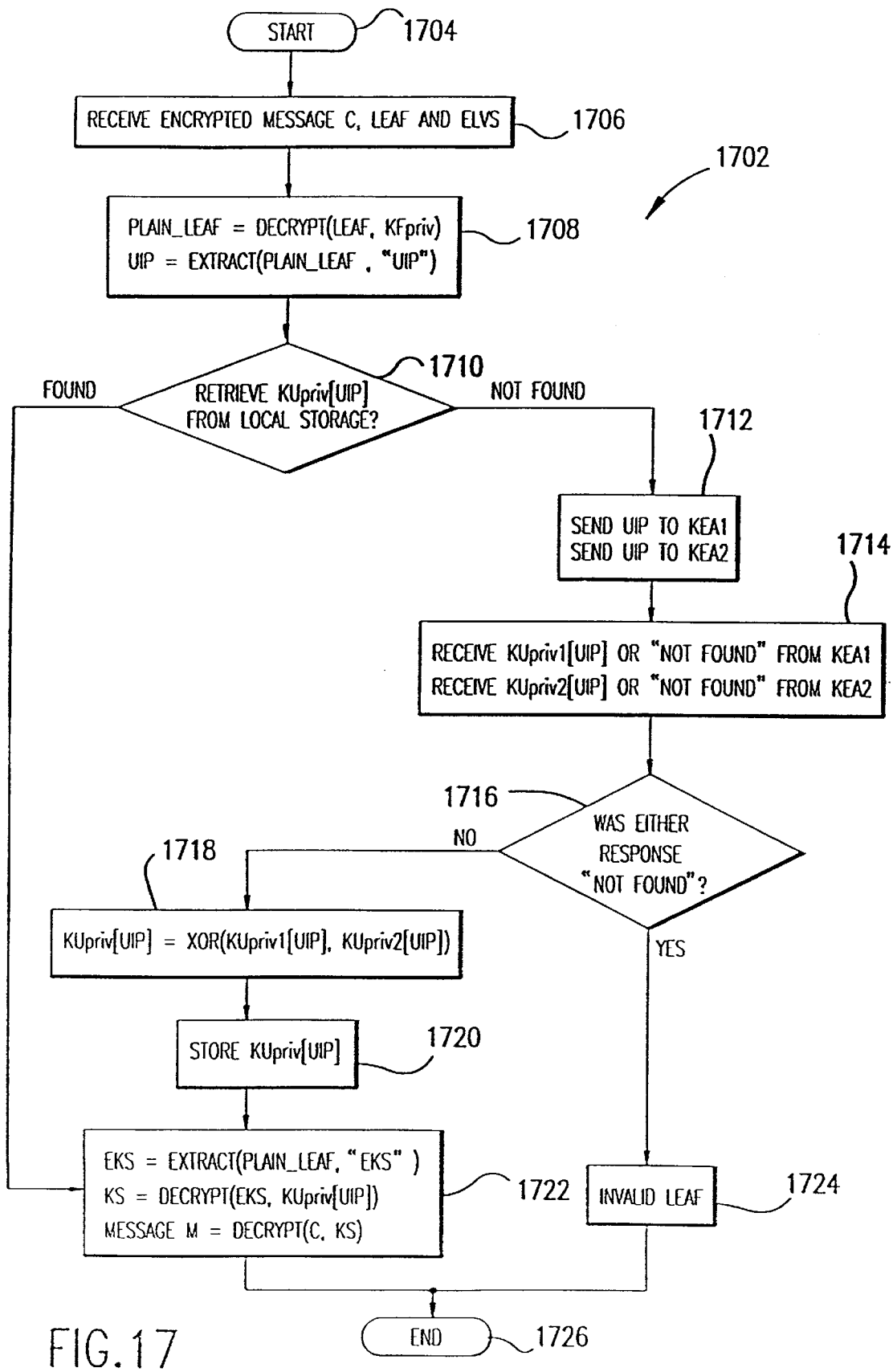

Since the LED 120 has possession of KFpriv, the LED 130 can decrypt the LEAF. This operation is represented in a flowchart 1702 in FIG. 17. In step 1706, the LED 120 receives C, LEAF, and ELVS from the sending program 124. In step 1708, the LED 130 decrypts the LEAF using KFpriv, and extracts the UIP from the decrypted LEAF (called "plain_LEAF" in FIG. 17). In steps 1710, 1712, 1714 and 1716, the LED 120 uses UIP to obtain the sending program 124's unique private key components, KUpriv1 and KUpriv2, from the respective key escrow agents 110, 114. If either key escrow agent indicates that they cannot find the private key component corresponding to UIP, then the LEAF is invalid (step 1724). In step 1718, the LED 130 combines KUpriv1 and KUpriv2 using preferably a well knorwn exclusive-OR operation to form the sending program 124's program unique key, KUpriv. KUpriv is stored in the LED 120 in step 1720. With KUpriv, the LED 130 in step 1722 decrypts the session key KS. Also in step 1722, given KS, the LED 120 decrypts the message.

Second Embodiment: On-line Escrow Agents

The key escrow protocol of the Clipper initiative has been criticized since it was initially disclosed because of the fact that a device whose unique key (KU in the original Clipper scheme) has been withdrawn from the escrow agents is subject to decryption from the time of withdrawal onward. While the stated policy of the Clipper initiative is that unique keys will be erased from the law enforcement decryptor (LED) once the wiretap authorization has expired, that policy is cold comfort to individuals who find key escrow unappealing to begin with.

The first embodiment of the software key escrow system of the present invention, described above, shares with the Clipper initiative the use of a device unique key (KUpriv) that is loaded into the law enforcement decryptor LED 120 and that must be erased when a wiretap authorization has expired. In addition, it is possible that a malicious user with a modified software product can harvest and reuse the escrow information (UIP and KUpub) for any other user with whom he or she communicates securely. This is a potential deficiency, in that it can cause the law enforcement agency to retrive KUpriv for innocent parties.

The second embodiment of the software key escrow system of the present invention addresses and solves these concerns. The second embodiment does away with the unique key (KU, KUpub, KUpriv) and identifier (UIP). Instead, each sender splits its session key KS and encrypts one fragment under the public key of each escrow agent. This scheme still incorporates a LEAF and a LEAF verification string, but it does away with the KEPF and simplifies the role of the vendor.

Figure 10:
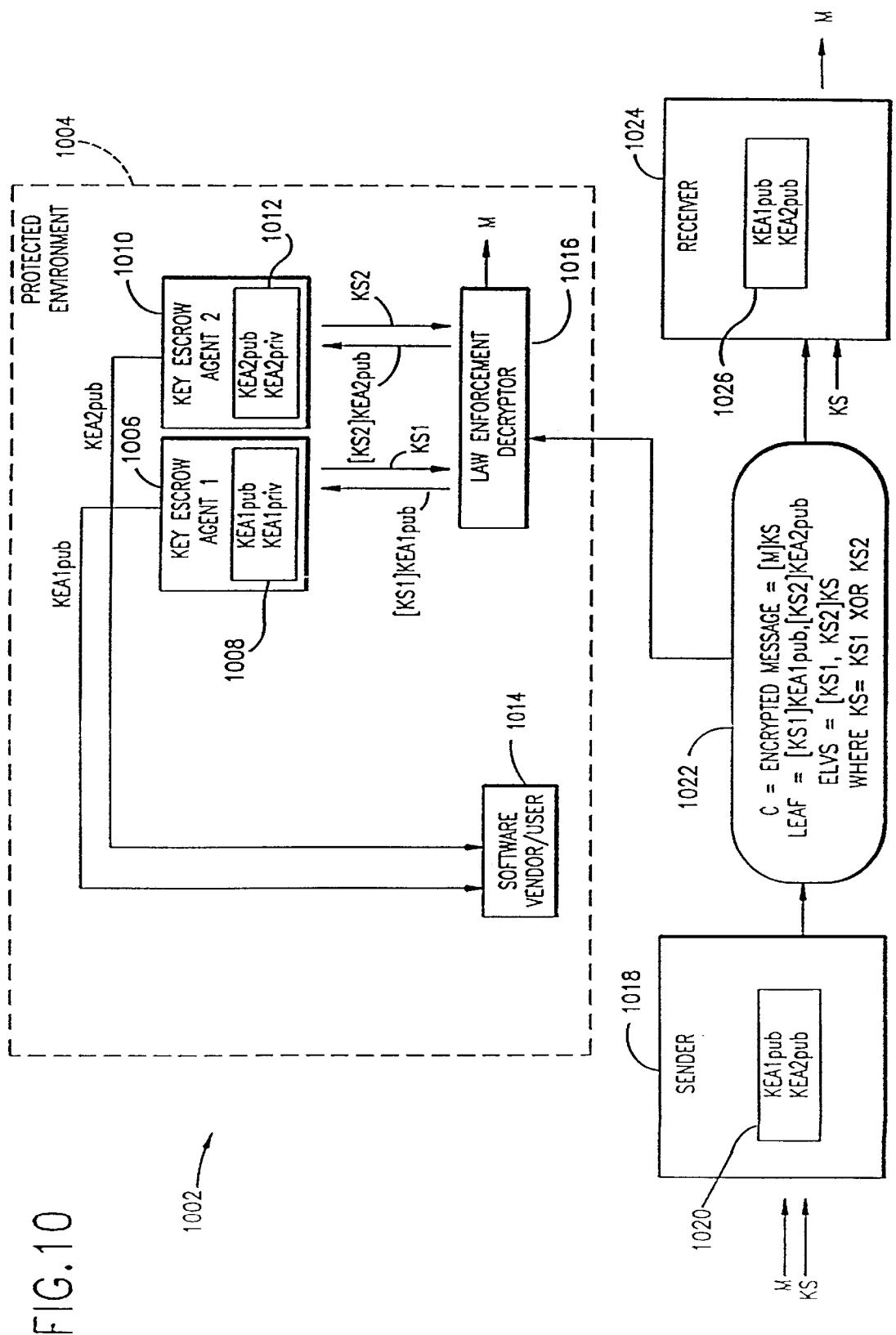
FIG. 10 is a block diagram of a key escrow cryptographic system according to a second embodiment of the present invention.
Figure 11:
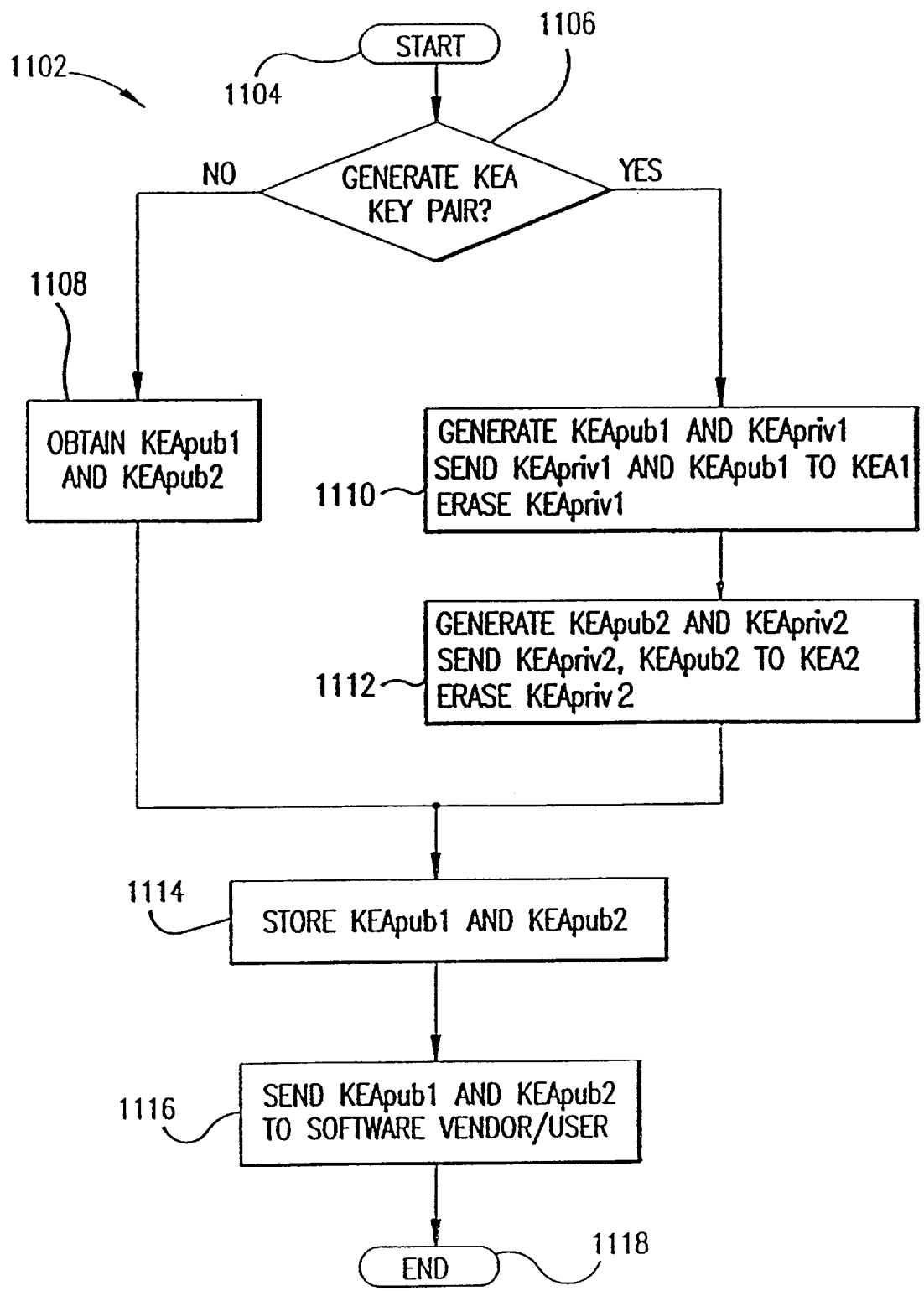
FIGS. 11–16 are flowcharts depicting the key escrow cryptographic system according to the second embodiment of the present invention.

FIG. 10 is a block diagram of the second embodiment. KEA1pub and KEA1priv (designated as 1008) are stored in the key escrow agent 1006, and KEA2pub and KEA2priv (designated as 1012) are stored in the key escrow agent 1010. Note that there is no key escrow programming facility (KEPF). However, there is some entity (not shown; this entity could be called the KEPF) in the protected environment 1004 that initializes the key escrow agents 1006 and 1010. Such initialization is represented by a flowchart 1102 in FIG. 11, where in step 1108 the entity obtains KEApub1 and KEApub2 from an external source (not shown). Alternatively, in steps 1110 the entity generates KEApub1, KEApriv1, KEApub2, and KEApriv2, sends KEApriv1 and KEApub1 to key escrow agent 1006, sends KEApriv2 and KEApub2 to key escrow agent 1010, and erases KEApriv1 and KEApriv2. In step 1114, the entity stores KEApub1 and KEApub2. In step 1116, the entity sends KEApub1 and KEApub2 to the software vendor 1014. Alternatively, as shown in FIG. 10, KEApub1 and KEApub2 are sent to the software vendor 1014 from key escrow agents 1006 and 1010.

Figure 12:
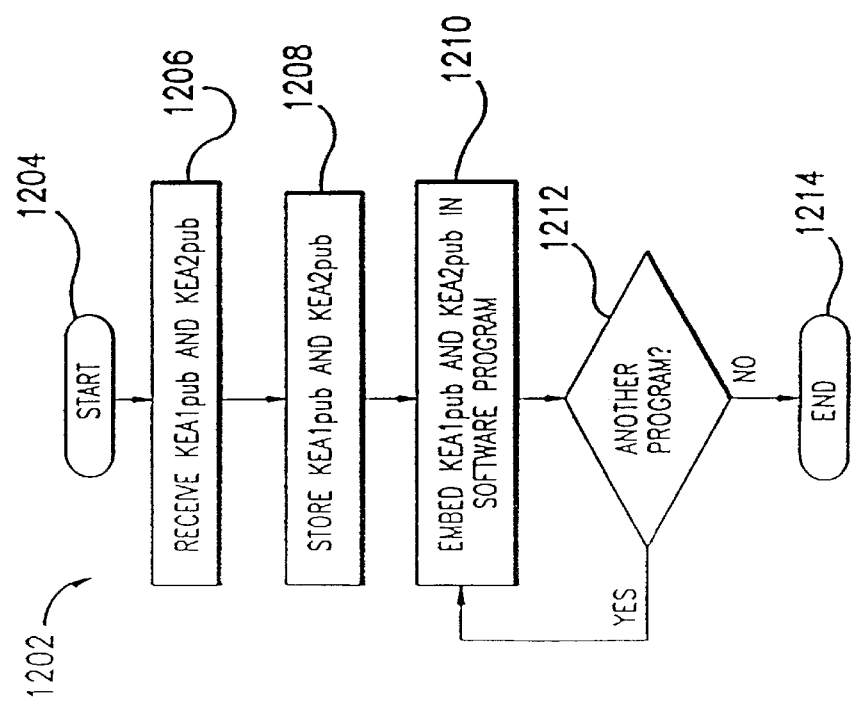

The vendor 1014's sole role is to embed in each program instance the code that implements the key escrow functions and the public keys of two (or more) escrow agents (KEA1pub and KEA2pub). These keys are represented by 1020 and 1026 in the sending program 1018 and the receiving program 1024, respectively. The operation of the software vendor 1014 is represented in FIG. 12, where in step 1206 the software vendor 1014 receives KEA1pub and KEA2pub from the key escrow agents 1006, 1010, in step 1208 the software vendor 1014 stores KEA1pub and KEA2pub, and in steps 1210 and 1212 the software vendor 1014 embeds KEA1pub and KEA2pub in each software program.

Figure 13:
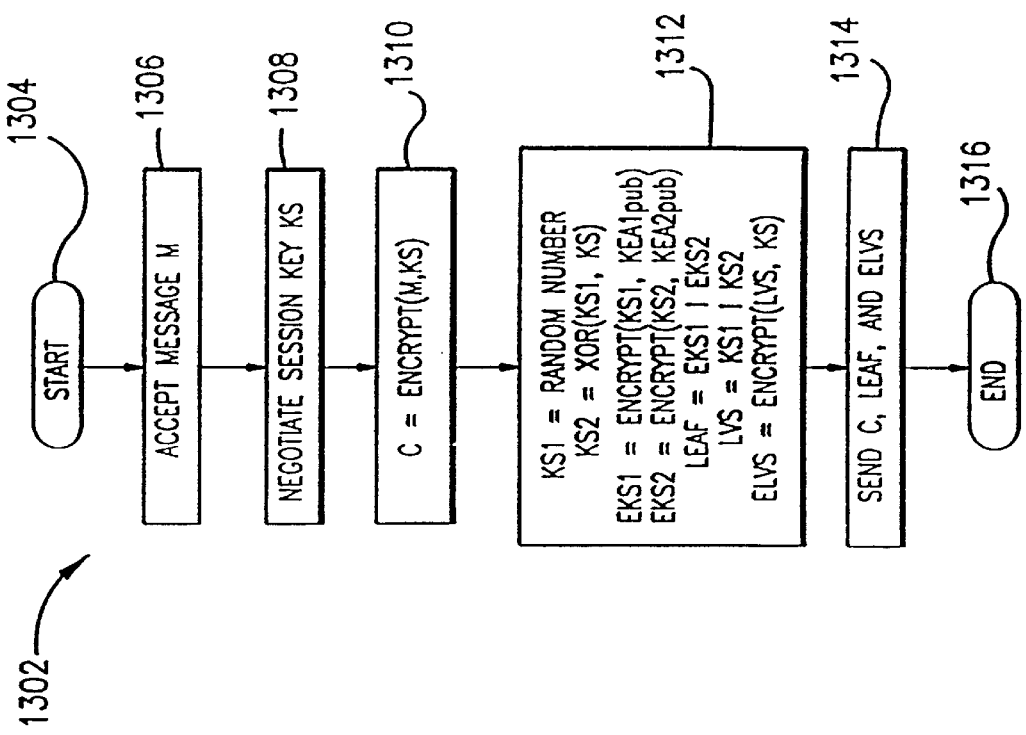

The sending program 1018 operates as shown in a flowchart 1302 of FIG. 13. In step 1306, the sending program 1018 receives a message M. In step 1308, the sending program 1018 negotiates a secret session key KS with the receiving program 1024 using any well known procedure. In step 1310, the sending program 1018 encrypts the message M using the session key KS.

In step 1312, the sending program 1018 splits the session key KS into two halves KS1 and KS2. Preferably, this is done by assigning a random number to KS1, and then assigning KS2 to the exclusive-OR of this random number and KS. The sending program 1018 also generates a LEAF during step 1312. The LEAF is equal to the concatenation of (1) KS1 encrypted under KEA1pub, and (2) KS2 encrypted under KEA2pub. Further in step 1312, the sending program 1018 generates a leaf verification string LVS that is equal the concatenation of KS1 and KS2. The encrypted leaf verification string ELVS is then generated and is equal to the LVS encrypted using the session key KS.

In step 1314, C, LEAF, and ELVS are sent to the receiving program 1026.

Figure 14:
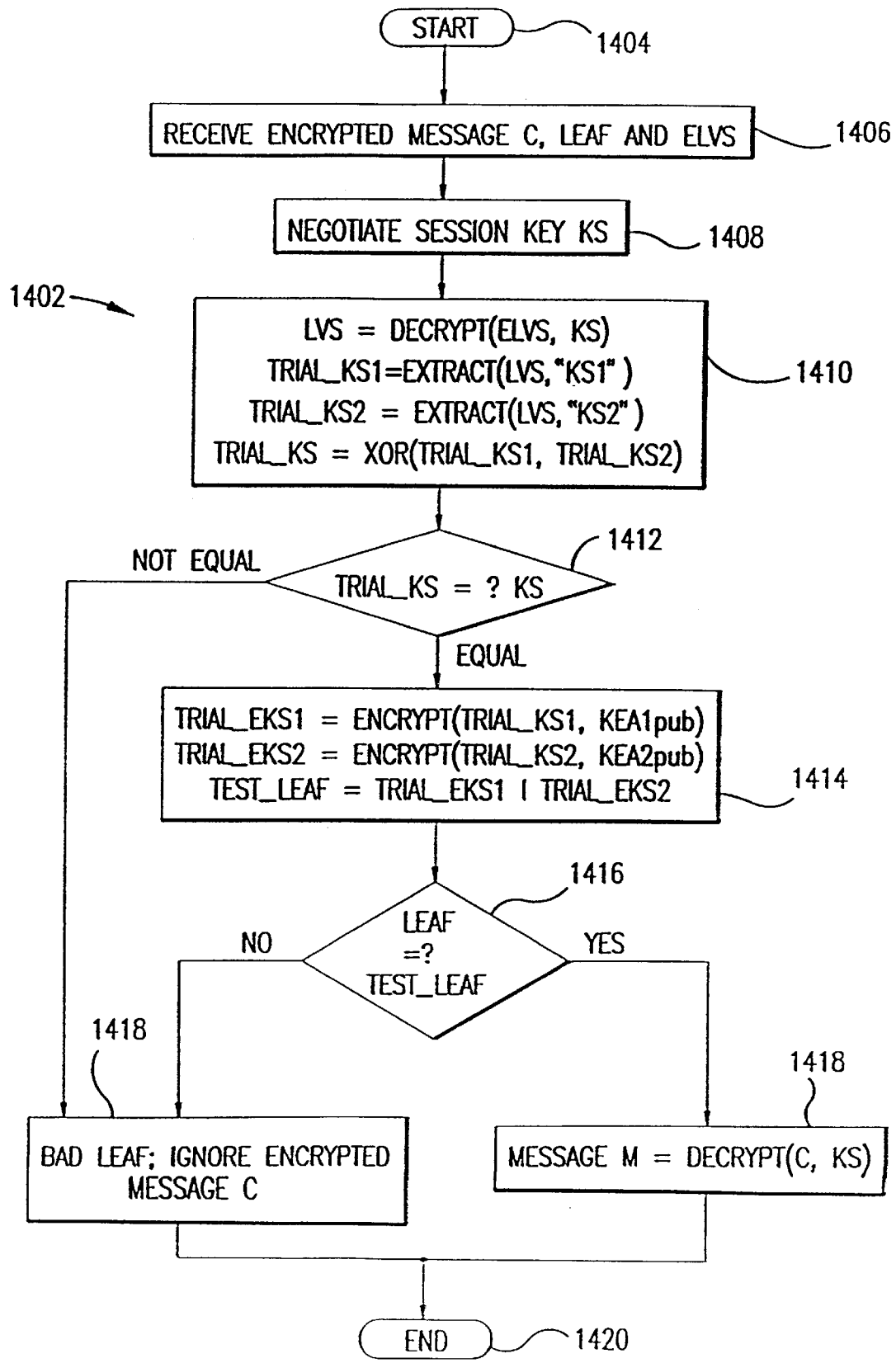

The operation of the receiving program 1024 is shown in a flowchart 1402 of FIG. 14. In step 1406, the receiving program 1024 receives C, LEAF, and ELVS from the sending program 1018. In step 1408, the session key KS is negotiated (this step corresponds to step 1308 in FIG. 13).

Then, the receiving program 1024 checks the leaf verification string LVS and then recomputes the LEAF. Specifically, in step 1410 the receiving program 1024 decrypts the encrypted leaf verification string ELVS using KS to obtain the leaf verification string LVS. The putative KS 1 and KS2 called Trial__KS1 and Trial__KS2 are extracted from LVS. Then, the receiving program 1024 generates the session key KS (called "Trial__KS" in step 1412) by exclusive-OR'ing Trial__KS1 and Trial__KS2 that were just extracted from LVS. In step 1412, the receiving program 1024 compares Trial__KS with the negotiated session key KS. If they are not equal, then the LEAF is bad and the message is rejected (step 1418).

If they are equal, then in step 1414 the receiving program 1024 uses its copies of KEA1pub and KEA2pub to recompute the LEAF. This is done by encrypting Trial__KS1 using KEA1pub and encrypting Trial__KS2 using KEA2pub to thereby generate Trial__EKS1 and Trial__EKS2, respectively. Then, a LEAF called test__LEAF is computed by concatenating Trial__EKS1 and Trial__EKS2.

In step 1416, the receiving program 1024 determines if Trial__LEAF is equal to the LEAF. If they are not equal, then the message is rejected (step 1418). If they are equal, then the LEAF is validated and the message M is decrypted using KS.

Figure 15:
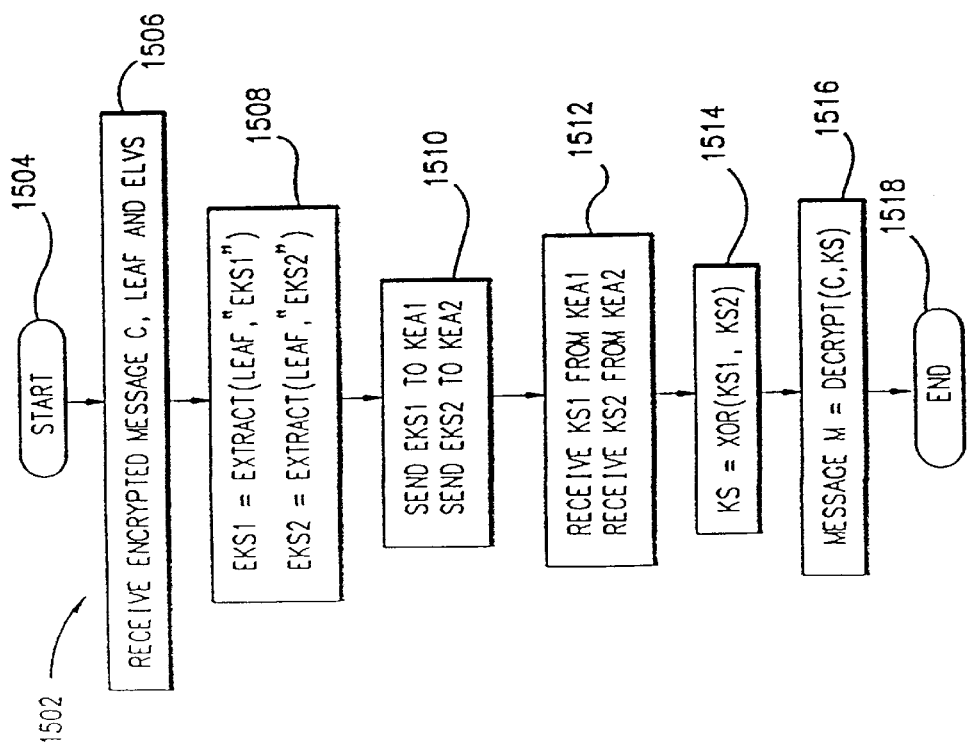

The operation of the law enforcement decryptor LED 1016 is shown in a flowchart 1502 of FIG. 15. In step 1506, the LED 1016 receives the C, LEAF, and ELVS from the sending program 1018. In step 1508, EKS1 and EKS2 are extracted from the LEAF. In step 1510, the LED 1016 sends EKS1 to key escrow agent (KEA) 1006 and sends EKS2 to KEA 1010. Also, the LED 1016 discloses a proper court order to each escrow agent 1006, 1010. Each agent 1006, 1010 verifies the validity of the court order, records its effective dates, and generates a secret key half KS1 or KS2 using either KEA1priv or KEA2priv for that particular court order and issues it to the LED 1016. This is represented by step 1512, where the LED 1016 receives KS1 from KEA1 1006 and KS2 from KEA2 1010. The LED 1016 combines the returned KS1 and KS2 to yield KS (step 1514), and decrypts the message using KS (step 1516).

Any submission of key parts for that wiretap to an escrow agent 1006, 1010 by the LED 1016 must be encrypted in the corresponding key. The escrow agents 1006, 1010 delete the secret keys KS1, KS2 on the expiration of the court order and are therefore unable to comply with any requests for keys after the expiration of the order. Since all communications with the escrow agents 1006, 1010 must be encrypted for security, this process adds no execution time to that operation.

Figure 16:
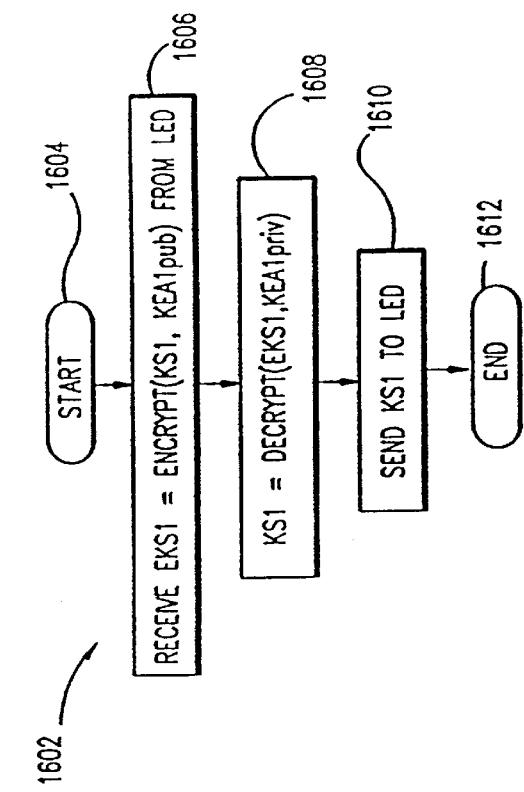

The operation of KEA1 1006 is shown in a flowchart 1602 in FIG. 16. KEA1 1006 and KEA2 1010 are identical, so the following description applies equally well to KEA2 1010. In step 1606, the KEA1 1006 receives EKS1 from the LED 1016. In step 1608, the KEA1 1006 decrypts EKS1 using KEA1priv to obtain KS1 . IN step 1610, the KEA1 1006 sends KS1 to the LED 1016.

Since there is no database linking a UIP to any individual targeted in a court order, the escrow agents 1006, 1010 have no choice but to trust the LED 1016's association of an individual targeted by a court order with a specific wiretap. The protocol described above may be modified to include a UIP in the LEAF portions sent to the escrow agents 1006, 1010, to enable those agents 1006, 1010 to maintain a list of program instances targeted under each court order for later auditing.

This second embodiment has the advantage that there is no product unique key to be disclosed to the LED 1016. Once surveillance ceases, the LED 1016 has no further ability to decrypt the sending program 1018's communications unless it again requests the services of the escrow agents 1006, 1010. As a side effect, there is no potential for a rogue application to trick the LED 1016 into withdrawing the unique keys of innocent users.

This second embodiment requires the escrow agents 1006, 1010 to be on line and involved with every decryption of a new session key. This is not considered to be a disadvantage since the escrow agents 1006, 1010 are committed to round-the-clock operation as part of the Clipper initiative. On-line computer systems at the escrow agents can be expected to respond within 0.2 seconds, provided they have hardware support for public key decryption, and reliable communications between escrow agents and LED should be easy enough to provide.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In an environment that includes a sender and a receiver, wherein the sender encrypts a communication using a first encryption key, a method for verifying the authenticity of an access field, comprising, the steps of:

(1) obtaining an access field forrecovery of athird encryption key, wherein said access field is an encrypted data structure created using at least a public portion of a second encryption key;

(2) obtaining a verification field, wherein said verification field includes information that is used to authenticate said access field; and (3) verifying, using said verification field, that the first encryption key used to encrypt the communication and said third encryption key are equivalent.

2. The method of claim 1, wherein:

said step (2) comprises obtaining a verification field, wherein said verification field includes public information that is used to authenticate said access field; and said step (3) comprises verifying, using said public information in said verification field, that the first encryption key used to encrypt the communication and said third encryption key are equivalent.

3. The method of claim 1, wherein said step (1) comprises the step of obtaining an access field, wherein said access field includes at least one part.

4. The method of claim 3, wherein said step (1) comprises the step of obtaining an access field, wherein said access field includes an encryption of the first encryption key used to encrypt the communication using a fourth encryption key.

5. The method of claim 4, wherein said step (1) comprises the step of obtaining an access field, wherein said access field includes an encryption of a first value using a fifth encryption key, wherein said first value is said encryption of the first encryption key used to encrypt the communication using said fourth encryption key.

6. The method of claim 5, wherein said step (1) comprises the step of obtaining an access field, wherein said access field includes an encryption of a concatenation of at least said first value and a second value using said fifth encryption key, wherein said second value is a program unique identifier.

7. The method of claim 3, wherein said step (1) comprises the step of obtaining an access field, wherein said access field includes at least two parts.

8. The method of claim 7, wherein said step (1) comprises the step of obtaining an access field, wherein a first part of said access field includes an encryption of at least part of the first encryption key used to encrypt the communication using a fourth encryption key.

9. The method of claim 8, wherein said step (1) comprises the step of obtaining an access field, wherein a second part of said access field includes an encryption of at least a second part of the first encryption key used to encrypt the communication using a fifth encryption key.

10. The method of claim 1, wherein said step (1) comprises the step of receiving an access field from a sender, wherein said access field is an encrypted data structure created using at least a public portion of a second encryption key, said access field allowing an entity to recover a third encryption key.

11. The method of claim 1, wherein said step (1) comprises the step of retrieving an access field from storage, wherein said access field is an encrypted data structure created using at least a public portion of a second encryption key, said access field allowing an entity to recover a third encryption key.

12. The method of claim 1, wherein said step (2) comprises the step of obtaining a verification field, wherein said verification field is based on at least one value used to create said access field.

13. The method of claim 1, wherein said step (2) comprises the step of obtaining a verification field, wherein said verification field is created using a public portion of a fourth encryption key.

14. The method of claim 13, wherein said step (2) comprises the step of obtaining a verification field, wherein said verification field includes an encryption of a concatenation of values using the first encryption key used to encrypt the communication, said concatenation of values including a program unique identifier and said public portion of said fourth encryption key.

15. The method of claim 1, wherein said step (2) comprises the step of obtaining a verification field, wherein said verification field includes an encryption of at least a part of the first encryption key used to encrypt the communication using the first encryption key used to encrypt the communication.

16. The method of claim 1, wherein said step (2) comprises the step of receiving a verification field, wherein said verification field includes information that is used to authenticate said access field.

17. The method of claim 16, wherein said step (2) comprises the step of receiving a verification field from a sender, wherein said verification field includes information that is used to authenticate said access field.

18. The method of claim 1, wherein said step (2) comprises the step of retrieving a verification field from storage, wherein said verification field includes information that is used to authenticate said access field.

19. The method of claim 1, wherein said step (3) comprises the step of verifying, by the receiver, using said verification field, that the first encryption key used to encrypt the communication and said third encryption key that is allowed to be recovered using said access field are equivalent.

20. The method of claim 1, wherein said step (3) comprises the steps of:

(a) constructing a second access field using at least part of the first encryption key used to encrypt the communication and said public portion of said second encryption key;

(b) comparing said access field obtained in said step (1) to said second access field, wherein if said access field is equivalent to said second access field, the first encryption key used to encrypt the communication and said third encryption key that is recovered using said access field are equivalent.

21. The method of claim 1, further comprising the step of:

(4) decrypting the encrypted communication if said verification is successful.

22. In an environment that includes a sender and a receiver, wherein the sender encrypts a communication using a first encryption key, an apparatus for verifying the authenticity of an access field, comprising:

means for obtaining an access field for recovery of a third encryption key, wherein said access field is an encrypted data structure created using at least a public portion of a second encryption key;

means for obtaining a verification field, wherein said verification field includes information that is used to authenticate said access field; and means for verifying, using said verification field, that the first encryption key used to encrypt the communication and said third encryption key are equivalent.

23. The apparatus of claim 22, wherein said verification field includes public information that is used to authenticate said access field; and said verifying means comprises means for verifying, using said public information in said verification field, that the first encryption key used to encrypt the communication and said third encryption key are equivalent.

24. A computer program product for use with a computer system, comprising:

a computer usable medium having computer readable program code means embodied in said medium for enabling the computer system to implement a method for verifying the authenticity of an access field, said method for verifying the authenticity of an access field operative in an environment that includes a sender and a receiver, wherein the sender encrypts a communication using a first encryption key, said computer readable program code means including, computer readable program code means for enabling a computer to effect an obtainment of an access field for recovery of a third encryption key, wherein said access field is an encrypted data structure created using at least a public portion of a second encryption key;

computer readable program code means for enabling a computer to effect an obtainment of a verification field, wherein said verification field includes information that is used to authenticate said access field; and computer readable program code means for enabling a computer to effect a verification using said verification field, said verification verifying that the first encryption key used to encrypt the communication and said third encryption key are equivalent.

25. The computer program product of claim 24, wherein said verification field includes public information that is used to authenticate said access field; and said verification computer readable program code means comprises means for enabling a computer to effect a verification using public information in said verification field, said verification verifying that the first encryption key used to encrypt the communication and said third encryption key are equivalent.

26. The method of claim 24, wherein said verifying step comprises verifying, using public information in a verification field, that the first encryption key used to encrypt the communication and a second encryption key that can be recovered using an access field are equivalent, wherein said access field is an encrypted data structure created using a public portion of a third encryption key and said verification field includes information that can be used to authenticate said access field.

27. The method of claim 24, wherein:

said step (2) comprises obtaining a verification field, wherein said verification field includes public information that is used to authenticate said access field; and said step (3) comprises verifying, using said public information in said verification field, that said access field that is obtained by the receiver, and the access field that is generated by the sender are equivalent.

28. In an environment that includes a sender and a receiver, wherein the sender encrypts a communication using a first encryption key, a method for verifying the authenticity of an access field, comprising the step of:

verifying, using a verification field, that the first encryption key used to encrypt the communication and a second encryption key that is recovered using an access field are equivalent, wherein said access field is an encrypted data structure created using a public portion of a third encryption key and said verification field includes information that can be used to authenticate said access field.

29. In an environment that includes a sender and a receiver, wherein the sender encrypts a communication using a first encryption key and generates an access field, a method for verifying the authenticity of an access field, comprising the steps of:

(1) obtaining an access field for recovery of a third encryption key, wherein said access field is an encrypted data structure created using at least a public portion of a second encryption key;

(2) obtaining a verification field, wherein said verification field includes information that is used to authenticate said access field; and (3) verifying, using said verification field, that said access field that is obtained by the receiver, and the access field that is generated by the sender are equivalent.

30. The method of claim 29, wherein said step (1) comprises the step of obtaining an access field, wherein said access field includes at least one part.

31. The method of claim 30, wherein said step (1) comprises the step of obtaining an access field, wherein said access field includes an encryption of the first encryption key used to encrypt the communication using a fourth encryption key.

32. The method of claim 31, wherein said step (1) comprises the step of obtaining an access field, wherein said access field includes an encryption of a first value using a fifth encryption key, wherein said first value is said encryption of the first encryption key used to encrypt the communication using said fourth encryption key.

33. The method of claim 32, wherein said step (1) comprises the step of obtaining an access field, wherein said access field includes an encryption of a concatenation of at least said first value and a second value using said fifth encryption key, wherein said second value is a program unique identifier.

34. The method of claim 30, wherein said step (1) comprises the step of obtaining an access field, wherein said access field includes at least two parts.

35. The method of claim 34, wherein said step (1) comprises the step of obtaining an access field, wherein a first part of said access field includes an encryption of at least part of the first encryption key used to encrypt the communication using a fourth encryption key.

36. The method of claim 35, wherein said step (1) comprises the step of obtaining an access field, wherein a second part of said access field includes an encryption of at least a second part of the first encryption key used to encrypt the communication using a fifth encryption key.

37. The method of claim 29, wherein said step (1) comprises the step of receiving an access field from a sender, wherein said access field is an encrypted data structure created using at least a public portion of a second encryption key, said access field allowing an entity to recover a third encryption key that enables said entity to decrypt the communication.

38. The method of claim 29, wherein said step (1) comprises the step of retrieving an access field from storage, wherein said access field is an encrypted data structure created using at least a public portion of a second encryption key, said access field allowing an entity to recover a third encryption key that enables said entity to decrypt the communication.

39. The method of claim 29, wherein said step (2) comprises the step of obtaining a verification field, wherein said verification field is based on at least one value used to create said access field.

40. The method of claim 29, wherein said step (2) comprises the step of obtaining a verification field, wherein said verification field is created using a public portion of a fourth encryption key.

41. The method of claim 40, wherein said step (2) comprises the step of obtaining a verification field, wherein said verification field includes an encryption of a concatenation of values using the first encryption key used to encrypt the communication, said concatenation of values including a program unique identifier and said public portion of said fourth encryption key.

42. The method of claim 29, wherein said step (2) comprises the step of obtaining a verification field, wherein said verification field includes an encryption of at least a part of the first encryption key used to encrypt the communication using the first encryption key used to encrypt the communication.

43. The method of claim 29, wherein said step (2) comprises the step of receiving a verification field, wherein said verification field includes information that is used to authenticate said access field.

44. The method of claim 43, wherein said step (2) comprises the step of receiving a verification field from a sender, wherein said verification field includes information that is used to authenticate said access field.

45. The method of claim 29, wherein said step (2) comprises the step of retrieving a verification field from storage, wherein said verification field includes information that is used to authenticate said access field.

46. The method of claim 29, wherein said step (3) comprises the steps of:
   (a) constructing a second access field using at least part of the first encryption key used to encrypt the communication and said public portion of said second encryption key;
   (b) comparing said access field obtained in said step (1) to said second access field, wherein if said access field is equivalent to said second access field, the first encryption key used to encrypt the communication and said third encryption key that is recovered using said access field are equivalent.

47. The method of claim 29, further comprising the step of:
   (4) decrypting the encrypted communication if said verification is successful.

48. In an environment that includes a sender and a receiver, wherein the sender encrypts a communication using a first encryption key and generates an access field, an apparatus for verifying the authenticity of an access field, comprising:
   means for obtaining an access field for recovery of a third encryption key, wherein said access field is an encrypted data structure created using at least a public portion of a second encryption key;
   means for obtaining a verification field, wherein said verification field includes information that is used to authenticate said access field; and
   means for verifying, using said verification field, that said access field that is obtained by the receiver, and the access field that is generated by the sender are equivalent.

49. The apparatus of claim 48, wherein said verification field includes public information that is used to authenticate said access field; and said verifying means comprises means for verifying, using said public information in said verification field, that said access field that is obtained by the receiver, and the access field that is generated by the sender are equivalent.

50. A computer program product for use with a computer system, comprising:
   a computer usable medium having computer readable program code means embodied in said medium for enabling the computer system to implement a method for verifying the authenticity of an access field, said method for verifying the authenticity of an access field operative in an environment that includes a sender and a receiver, wherein the sender encrypts a communication using a first encryption key and generates an access field, said computer readable program code means including,
   computer readable program code means for enabling a computer to effect an obtainment of an access field for recovery of a third encryption key, wherein said access field is an encrypted data structure created using at least a public portion of a second encryption key;
   computer readable program code means for enabling a computer to effect an obtainment of a verification field, wherein said verification field includes information that is used to authenticate said access field; and computer readable program code means for enabling a computer to effect a verification using said verification field, said verification verifying that said access field that is obtained by the receiver, and the access field that is generated by the sender are equivalent.

51. The computer program product of claim 50, wherein said verification field includes public information that is used to authenticate said access field; and said verification computer readable program code means comprises means for enabling a computer to effect a verification using said public information in said verification field, said verification verifying that said access field that is obtained by the receiver, and the access field that is generated by the sender are equivalent.

52. In an environment that includes a sender and a receiver, wherein the sender encrypts a communication using a first encryption key and generates an access field for recovery of a third encryption key, a method for verifying the authenticity of an access field, comprising the step of:

verifying, using said verification field, that an access field that is obtained by the receiver, and the access field that is generated by the sender are equivalent, wherein an access field is an encrypted data structure created using at least a public portion of a second encryption key, wherein said verification field includes information that can be used to authenticate said access field.

53. The method of claim 52, wherein said verifying step comprises:

verifying, using public information in said verification field, that an access field that is obtained by the receiver, and the access field that is generated by the sender are equivalent.

* * * * *